United States Patent
Tajima et al.

(10) Patent No.: US 8,060,022 B2
(45) Date of Patent: Nov. 15, 2011

(54) COMMUNICATION METHOD IN MOBILE COMMUNICATION SYSTEM, AND MOBILE STATION AND BASE STATION IN THE SAME SYSTEM

(75) Inventors: Yoshiharu Tajima, Kawasaki (JP); Hideto Furukawa, Kawasaki (JP); Kazuo Kawabata, Kawasaki (JP); Yoshihiro Kawasaki, Kawasaki (JP); Kazuhisa Obuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/819,299

(22) Filed: Jun. 21, 2010

(65) Prior Publication Data

US 2010/0284362 A1 Nov. 11, 2010

Related U.S. Application Data

(62) Division of application No. 11/226,418, filed on Sep. 15, 2005.

(30) Foreign Application Priority Data

Jun. 23, 2005 (JP) .................................. 2005-183223

(51) Int. Cl.
*H04B 17/00* (2006.01)
(52) U.S. Cl. .................. 455/67.11; 455/450; 455/452.1; 455/452.2; 370/329
(58) Field of Classification Search ............... 455/67.11, 455/450, 452.1, 452.2, 509, 510, 513; 370/329
See application file for complete search history.

(56) References Cited

U.S. PATENT DOCUMENTS

| | | | |
|---|---|---|---|
| 5,673,259 A * | 9/1997 | Quick, Jr. ....................... | 370/342 |
| 6,529,489 B1 | 3/2003 | Kikuchi | |
| 6,804,206 B1 | 10/2004 | Moulsley | |
| 7,215,653 B2 | 5/2007 | Kim | |
| 2004/0127225 A1* | 7/2004 | Qiu et al. ....................... | 455/450 |
| 2004/0184421 A1* | 9/2004 | Hondo ........................... | 370/329 |
| 2005/0003843 A1 | 1/2005 | Ho et al. | |
| 2005/0020290 A1 | 1/2005 | Arata | |
| 2006/0291403 A1 | 12/2006 | Kahtava et al. | |
| 2007/0025320 A1 | 2/2007 | Padovani | |

FOREIGN PATENT DOCUMENTS

| | | |
|---|---|---|
| JP | 6054385 A | 2/1994 |
| JP | 7250093 A | 9/1995 |
| JP | 11340992 | 12/1999 |
| JP | 2000341358 A | 12/2000 |

(Continued)

OTHER PUBLICATIONS

3GPP TS 25.309 V6.2.0 (Mar. 2005); 3rd Generation Partnership Project; Technical Specification Group Radio Access Network; FDD Enhanced Uplink; Overall description; Stage 2 (Release 6).

(Continued)

*Primary Examiner* — Tuan H Nguyen
(74) *Attorney, Agent, or Firm* — Murphy & King, P.C.

(57) ABSTRACT

The present method adds uplink data to a transmission request sent to the base station from the mobile station for obtaining permission for data transmission, or to a channel establishment request sent from the mobile station to the base station for establishing a channel in order to send the transmission request therethrough. This makes it possible to suppress delay caused by negotiation prior to actual uplink data transmission as much as possible, thereby realizing efficient uplink data transmission, that is, improved throughput of uplink communication.

5 Claims, 25 Drawing Sheets

FOREIGN PATENT DOCUMENTS

| JP | 2002544733 A | 12/2002 |
|---|---|---|
| JP | 2003218995 A | 7/2003 |
| JP | 200564795 A | 3/2005 |

OTHER PUBLICATIONS

Gyung-Ho Hwang et al: "Dynamic rate control based on interference and transmission power in 3GPP WCDMA system" Sep. 24, 2000, Vehicular Technology Conference, 2000, Piscataway, NJ, USA, IEEE, pp. 2926-2931, XP010525114 ISBN: 0-7803-6507-0.

Weber R: "Low-complexity channel estimation for WCDMA random access" Vehicular Technology Conference, 2000. IEEE VTS Fall VTC 2000. 52nd Sep. 24-28, 2000, Piscataway, NJ, USA, IEEE, vol. 1, Sep. 24, 2000 pp. 344-351, XP010525187 ISBN: 0-7803-6507-0.

European Search Report dated Oct. 13, 2006.
Non-final Office Action dated Feb. 22, 2008.
Final Office Action dated Aug. 5, 2008.
Non-final Office Action dated Jan. 8, 2009.
Non-final Office Action dated Sep. 8, 2009.
Non-Final Office Action dated Aug. 19, 2010 received in U.S. Appl. No. 11/226,418.
Non-Final Office Action dated Aug. 4, 2010 received in U.S. Appl. No. 12/535,996.
Final Office Action dated Jan. 6, 2011 received in U.S. Appl. No. 12/535,996.
Notice of Ground of Rejection dated Sep. 14, 2010 received in corresponding Japanese Patent Application No. 2005-183223.
Non-Final Office Action dated Feb. 7, 2011 in U.S. Appl. No. 11/226,418.
Decision of Rejection dated Apr. 26, 2011 received in corresponding Japanese Patent Application No. 2005-183223.
Notice of Allowance dated Jul. 21, 2011 received in U.S. Appl. No. 11/226,418.
Notice of Allowance dated Sep. 16, 2011 received in U.S. Appl. No. 12/535,996.

* cited by examiner

FIG. 8

| SIGNATURE | PACKET DATA |
|---|---|

FIG. 10

| ACK/NACK | ASSIGNMENT PERMISSION/NON-PERMISSION |
|---|---|

COMMUNICATION METHOD IN MOBILE COMMUNICATION SYSTEM, AND MOBILE STATION AND BASE STATION IN THE SAME SYSTEM

CROSS REFERENCE TO RELATED APPLICATIONS

This application is a divisional of application Ser. No. 11/226,418, filed Sep. 15, 2005, which is based on and hereby claims priority to Japanese Application No. 2005-183223 filed on Jun. 23, 2005 in Japan, the contents of which are hereby incorporated by reference.

BACKGROUND OF THE INVENTION (1) Field of the Invention

The present invention relates to a communication method in a mobile communication system and a mobile station and a base station in the same system. The invention relates particularly to a technique suitable to improve the throughput of uplink data communication from the mobile station to the base station.

(2) Description of Related Art

In the current 3GPP (3rd Generation Partnership Project), standardization of W-CDMA. (Wideband-Code Division Multiple Access), which is one of the schemes of the third-generation mobile communication system, is in progress. One of the themes of the standardization is the HSDPA (High Speed Downlink Packet Access) scheme which provides a great-capacity high-speed packet data transfer (about 14 Mbps at maximum) in the downlink direction from a base station to a mobile station. Further, the HSUPA (High Speed Uplink Packet Access) scheme, which can be regarded as HSDPA in the uplink direction from a mobile station to a base station, is under investigation (see, for example, the following non-patent document 1).

In such high-speed data transmission, data transmission scheduling for efficient sending-out of data packet is important. In HSUPA, scheduling is determined based on such information as reception quality, the amount of buffer remaining, priority, and so on. These information items are notified from a mobile station to a base station as Scheduling Information (SI) in form of an uplink transmission request prior to uplink transmission.

[Non-patent Document 1] 3rd Generation Partnership Project (3GPP); Technical Specification Group Radio Access Network; "TS 25.309 V6.2.0 (2005-03) FDD Enhanced Uplink Overall Description Stage 2 (Release 6)"

In the present 3GPP specification, communication execution by HSUPA is performed after establishment of dedicated radio channels, and as procedures from call generation to call setting and HSUPA application, known procedures applied. Accordingly, delay occurs between a data transmission request on a terminal and actual data transmission.

For example, as shown in FIG. 25, a mobile station (UE: User Equipment) 100 sends an access request to a base station (BTS: Base Transceiver Station) 200 (step S100) by a random access method. Upon receipt of a reply to the access request from the base station 200 (step S200), the mobile station 100 sends a dedicated radio channel establishment request to the base station 200 (step S300). When a reply to the channel establishment request is received by the mobile station 100 (step 400), the mobile station 100 sends a transmission rate request to the base station 200 (step S500). When a rate is assigned by the base station 200 (step S600) in response to the transmission rate request, the mobile station 100 eventually starts data transmission (steps S700 and S900). Here, when the data transmitted is normally received by the base station 200, ACK is sent back to the mobile station 100, and when the data transmitted is not received normally, NACK is sent back to the mobile station 100 (step S800). Upon receipt of NACK, the mobile station 100 performs data retransmission.

Under a condition where the data rate is low, delay caused by such negotiation prior to actual uplink data transmission is inconspicuous, but as the data rate increases, the delay becomes a considerable problem. In addition, for realization of "Always on" by radio, it is preferable that connection delay be as small as possible.

SUMMARY OF THE INVENTION

With the foregoing problems in view, it is an object of the present invention to suppress delay caused by negotiation prior to actual uplink data transmission as much as possible, thereby realizing efficient uplink data transmission, that is, an improved throughput of uplink communication.

In order to accomplish the above object, according to the present invention, the following communication method, mobile station, and base station are provided.

(1) As a generic feature, there is provided a communication method in a mobile communication system including at least one mobile station and a base station, which performs radio communication with the mobile station, the communication method comprising: on the mobile station, adding uplink data to a transmission request sent to the base station for obtaining permission for data transmission, or to a channel establishment request sent to the base station for establishing a channel in order to send the transmission request therethrough.

(2) As another generic feature, there is provided a communication method in a mobile communication system including at least one mobile station and a base station, which performs radio communication with the mobile station, wherein the base station is operable in a first mode in which the base station's permission is not necessary when the mobile station transmits uplink data, and a second mode in which the base station's permission is necessary when the mobile station transmits uplink data, the method comprising: on the base station, monitoring an uplink communication state between the base station and the mobile station; operating in the first mode if the uplink communication state is of a specific or higher level of quality; and operating in the second mode if the uplink communication state is of quality lower than the specific level.

(3) As yet another generic feature, there is provided a mobile station for a mobile communication system including at least one mobile station and a base station, which performs radio communication with the mobile station, the mobile station comprising: a transmitter means which transmits a transmission request to the base station for obtaining permission for data transmission or a channel establishment request to the base station for establishing a channel in order to send the transmission request therethrough; and a data adding means which adds uplink data to the transmission request or to the channel establishment request.

(4) As a further generic feature, there is provided a base station for a mobile communication system including at least one mobile station and a base station, which performs radio communication with the mobile station, the base station comprising: a reply information transmitter means which transmits reply information, indicating whether or not the uplink data sent from the mobile station has been normally received, to the mobile station; and a notification information adding means which adds transmission permission/non-permission notification information, indicating whether or not data transmission is permitted in response to the transmission request, to the reply information to be sent to the mobile station.

(5) As a still further generic feature, there is provided a base station for a mobile communication system including at least one mobile station and a base station, which performs radio communication with the mobile station, wherein the mobile station is operable in a first mode in which the base station's permission is not necessary when the mobile station transmits uplink data, and a second mode in which the base station's permission is necessary when the mobile station transmits uplink data, the base station comprising: an uplink communication state monitoring means which monitors an uplink communication state between the base station and the mobile station; an evaluating means which evaluates whether or not the communication state monitored by the communication state monitoring means is of a specific or higher level of quality; and a mode selecting means which selects the first mode as an operation mode if the evaluation result is positive, and which selects the second mode as an operation mode if the evaluation result is negative.

(6) As a preferred feature, the base station for a mobile communication system, further comprises: a data collision monitoring means which monitors, while operating in the first mode, whether or not a collision occurs in uplink data transmission from two or more mobile stations; and a retransmission timing notifying means which notifies each of the mobile stations, if an occurrence of a collision is detected by the data collision monitoring means, of retransmission timing in the uplink data transmission.

(7) As another generic feature, there is provided a mobile station for a mobile communication system including at least one mobile station and a base station, which performs radio communication with the mobile station, in which mobile communication system the base station notifies, if a collision occurs in uplink data transmission from two or more mobile stations, each of the mobile stations of retransmission timing in the uplink data transmission, the mobile station comprising: a uplink data generating means which generates uplink data including: a user identification portion identifying each mobile station; and a data portion, which is a message body; an uplink data transmitter means which transmits the uplink data generated by the uplink data generating means to the base station.

(8) As a preferred feature, the uplink data generating means generates the uplink data as data having a fixed data length.

(9) As another preferred feature, the uplink data generating means includes an encoding means which encodes the data portion based on information of the user identification portion.

(10) As yet another preferred feature, the uplink data generating means includes an inserting means which inserts information of the user identification portion into the data portion.

The above-described invention realizes efficient data transmission. Delay at the time of call setting is expected to be reduced and improvement in throughput is also expected.

Other objects and further features of the present invention will be apparent from the following detailed description when read in conjunction with the accompanying drawings.

BRIEF DESCRIPTION OF THE DRAWINGS

FIG. 8 is a diagram showing a frame construction of a random access signal according to the second embodiment;

FIG. 10 is a diagram showing a frame construction of a downlink signal according to the second embodiment;

DESCRIPTION OF THE PREFERRED EMBODIMENT(S)

(A) First Embodiment

Figure 1:
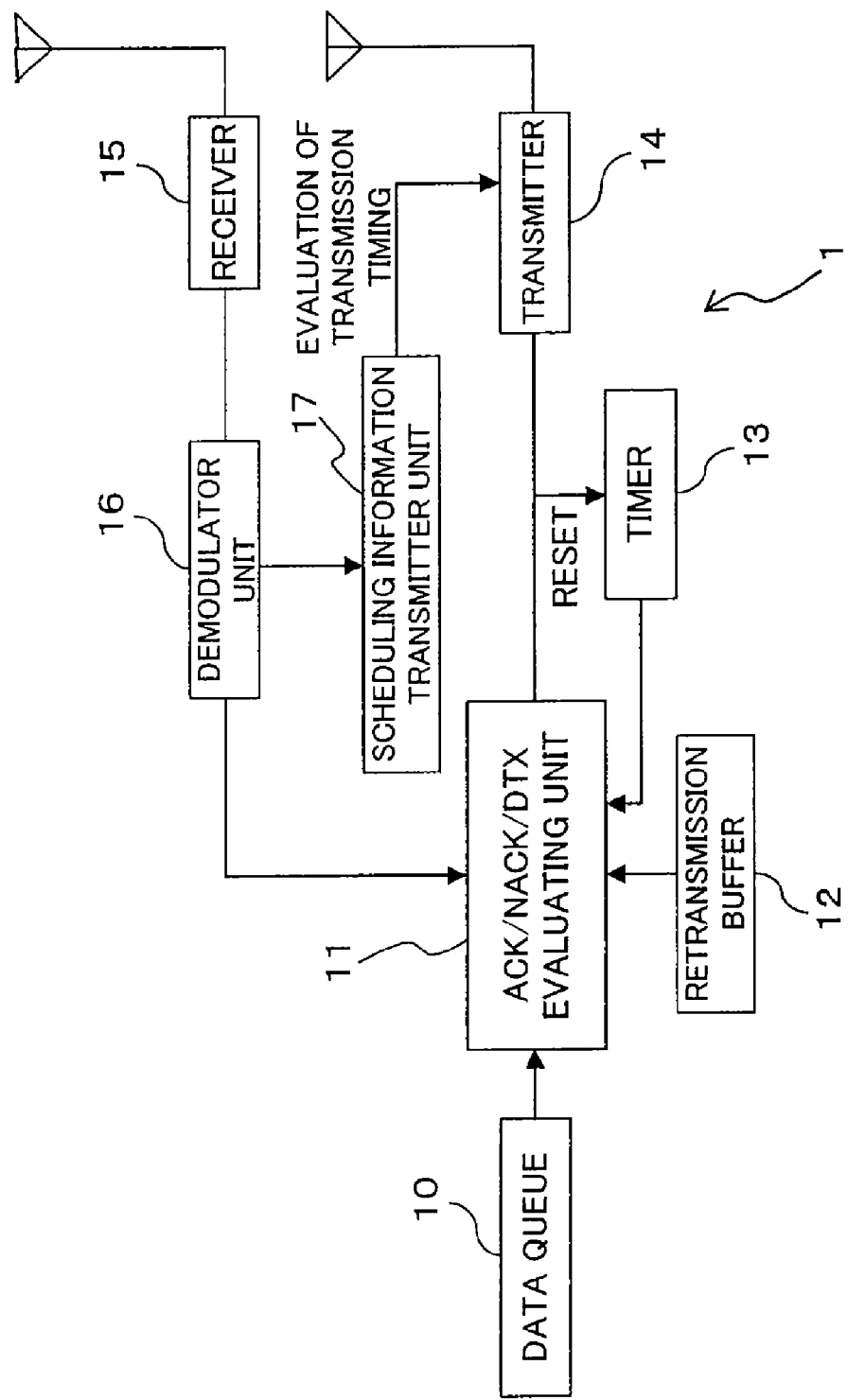
FIG. 1 is a block diagram showing a construction of a radio mobile station, which is a constituent of a mobile communication system according to a first embodiment of the present invention.
Figure 2:
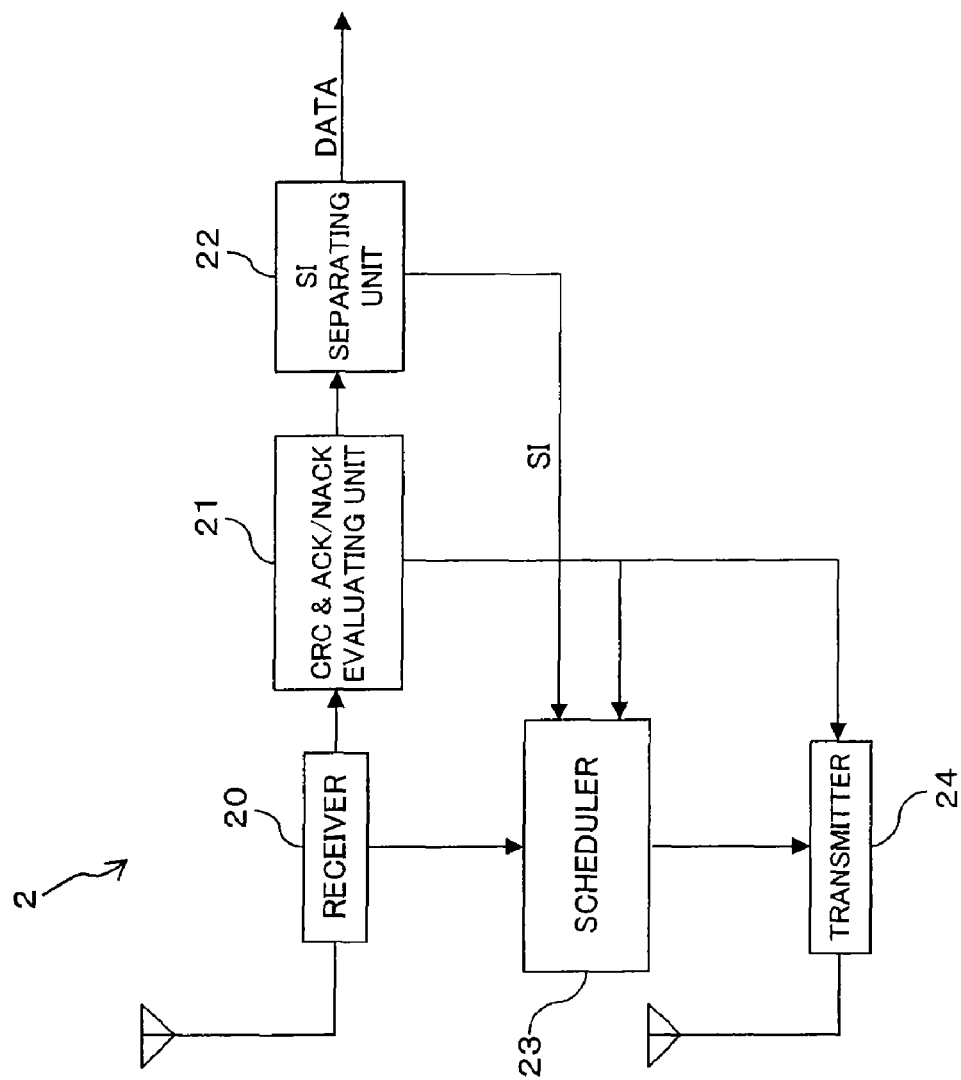
FIG. 2 is a block diagram showing a construction of a radio base station, which is a constituent of the mobile communication system according to the first embodiment of the present invention.

FIG. 1 is a block diagram showing a construction of a radio mobile station, which is a constituent of a mobile communication system according to a first embodiment of the present invention; FIG. 2 is a block diagram showing a construction of a radio base station, which is a constituent of the same system. The radio mobile station (hereinafter will be simply called the "mobile station") 1 in FIG. 1 accesses the radio base station (hereinafter will be simply called the "base station") 2 in FIG. 2 by radio for establishing communication therebetween. Here, downlink communication, from the base station 2 to the mobile station 1, is performed, for example, based on the HSDPA scheme, and uplink communication, from the mobile station 1 to the base station 2, is performed, for example, based on the HSUPA scheme. The above mobile communication system includes one or more mobile stations 1 of FIG. 1 and one or more base stations 2 of FIG. 2.

As shown in FIG. 1, with attention focused on its important part, the mobile station 1 includes: a data queue 10; an ACK/NACK/DTX evaluating unit 11; a retransmission buffer 12; a timer 13; a transmitter 14; a receiver 15; a demodulator unit 16; and a scheduling information transmitter unit 17. As shown in FIG. 2, with attention focused on its important part, the base station 2 includes: a receiver 20; a CRC and ACK/NACK evaluating unit 21; an SI separating unit 22; a scheduler 23; a transmitter 24.

Here, in the mobile station 1 of FIG. 1, the data queue 10 holds data packets (uplink signals) waiting for transmission; the ACK/NACK/DTX evaluating unit (hereinafter will be also simply called the "evaluating unit") 11 evaluates if ACK or NACK has been received from the base station 2 as a result of data demodulation by the demodulator unit 16, or if no data packet (downlink signal) is received from the base station 2 (DTX). Upon confirmation of receipt of ACK, the evaluating unit 11 takes out a data packet waiting for transmission from the data queue 10 and sends the data packet to the transmitter 14. Upon confirmation of receipt of NACK, the evaluating unit 11 takes out an object data packet, which has already been transmitted, from the retransmission buffer 12, and then sends the object data packet to the transmitter 14.

The timer 13 measures a predetermined time period elapsed after the data packet is transferred to the transmitter 14, that is, after the data packet is sent to the base station 2. If the evaluating unit 11 does not confirm the receipt of ACK or NACK even after elapse of the predetermined time, the timer 13 gives the evaluating unit 11a trigger which makes the evaluating unit 11 end a standby mode for receiving ACK or NACK and makes the transmission processing proceed to the next step.

The transmitter 14, which transmits uplink transmission data packets from the evaluating unit 11 to the base station 2 by radio, has necessary radio transmission processing functions such as modulation and spread of transmission data packets, and upconversion of the data packets to radio frequencies.

The receiver 15, which receives data packets sent from the base station 2 by radio at radio frequencies, has necessary radio reception processing functions such as downconversion of the data packets to an intermediate frequency (IF) band and a baseband. The demodulator unit 16 performs necessary demodulation processing to the baseband signal from the receiver 15, the modulation processing corresponding to the transmission modulation scheme {(e.g., QPSK (Quadrature Phase Shift Keying) or 16-QAM (Quadrature Amplitude Modulation)} used on the base station 2.

Figure 4:
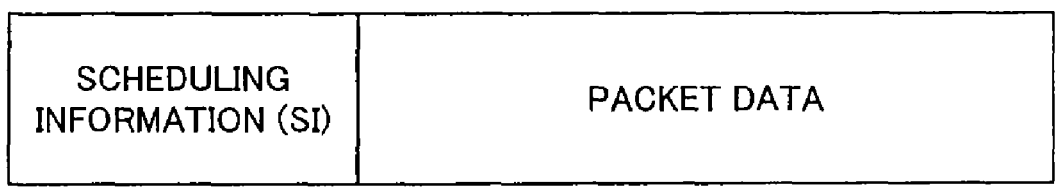
FIG. 4 is a diagram showing a frame construction of an uplink transmission request according to the first embodiment.

The scheduling information transmitter unit 17 transmits scheduling information (SI)(a transmission request for obtaining transmission permission from the base station 2), such as a transmission rate assignment request to the base station 2, to the base station 2 via the transmitter 14. In the present example, as shown in FIG. 4, the scheduling information transmitter unit 17 generates a signal (data packet) in which uplink data (transmission user data) to the base station 2 is added to the scheduling information, and then transmits the generated data to the base station 2. In other words, the transmitter 14 functions as a transmitter means for transmitting a transmission request to the base station 2 in order to obtain transmission permission from the base station 2; the scheduling information transmitter unit 17 functions as a data adding means for adding uplink data to the above transmission request.

On the other hand, in the base station 2 of FIG. 2, the receiver 20, which receives data packets sent from the mobile station 1 at radio frequencies, has necessary radio reception processing functions such as downconversion of the data packet to an intermediate frequency (IF) band or a baseband and demodulation processing by QPSK or 16-QAM of the data packet. The CRC and ACK/NACK evaluating unit 21 performs CRC on a baseband signal received from the receiver 20 to carry out ACK/NACK evaluation. More precisely, if the CRC reveals a normal result, the CRC and ACK/NACK evaluating unit 21 generates ACK; if the CRC reveals an abnormal result, the CRC and ACK/NACK evaluating unit 21 generates NACK.

The SI separating unit 22 separates and extracts the scheduling information from the received baseband signal, and the scheduler 23 performs sending-out scheduling of downlink (destined to the mobile station 1) data packet.

The scheduling is determined based on such information as the quality of a received data packet, the amount of buffer remaining, and priority.

The transmitter 24, which transmits downlink transmission data packets by radio, has radio transmission processing functions such as modulation and spread of transmission data packets and upconversion of the data packets to radio frequencies.

Now, referring to FIG. 3, a description will made hereinbelow of an operation of a mobile communication system of the present embodiment with the above-described construction.

At execution of HSUPA, the mobile station (UE) 1 transmits a random access signal, including a signature (information identifying each mobile station 1), to the base station (BTS) 2 at initiation of data transmission. The random access signal is sent through a common channel as an uplink data packet (step S1). When receiving the random access signal, the base station 2 transmits a reply to the access signal to the mobile station 1 (step 2), whereby a communication path is established over the common channel between the mobile station 1 and the base station 2.

Upon receipt of the above reply, the mobile station 1 generates a signal (data packet) in which scheduling information (transmission rate assignment request) is added to the uplink transmission user data, as already described referring to FIG. 4, in order to request the base station 2 to establish a dedicated channel, and then transmits the generated signal to the base station 2 through the communication path established over the foregoing common channel (step S3). Upon receipt of the above transmission rate assignment request, the base station 2 evaluates whether or not the requested rate can be assigned to the mobile station 1. If the assignment is available, a message to that effect is sent back to the mobile station 1 as a transmission rate assignment reply (step S4).

When the mobile station 1 receives the transmission rate assignment reply from the base station 2, a dedicated channel is established between the mobile station 1 and the base station 2, whereby the mobile station 1 is ready for transmitting an uplink data packet. The mobile station 1 then starts to send an uplink data packet at the assigned rate through the assigned dedicated channel (step S5). If the base station 2 decides that it is impossible to assign the requested rate, it is possible for the base station 2, for example, to assign the maximum rate which can be assigned to the mobile station 1 at that time.

As described so far, according to the system of the present example, since an uplink data packet is added (superimposed) to a transmission rate request sent from the mobile station 1 to the base station 2, it is possible to reduce the procedures in need for starting data transmission, in comparison with the prior art. This also makes it possible to shorten a call-setting time, thereby reducing delay until the start of data transmission. In this case, the amount of data to be added depends on the transmission rate of the dedicated channel, so that the transmission rate is kept lower than that of normal uplink packet transmission. However, since the time until the start of data transmission is shortened, throughput is expected to be improved.

(B) Second Embodiment

Figure 5:
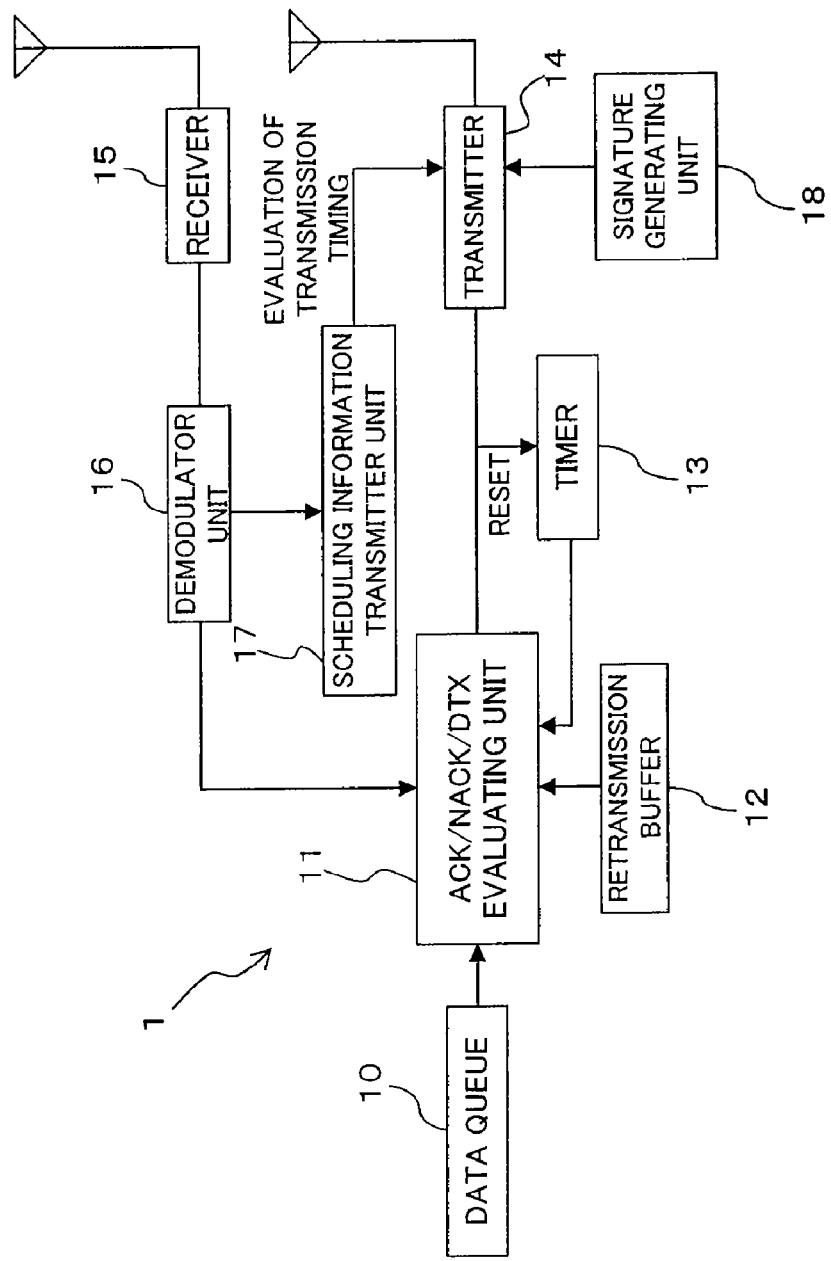
FIG. 5 is a block diagram showing a construction of a radio mobile station, which is a constituent of a mobile communication system according to a second embodiment of the present invention.
Figure 6:
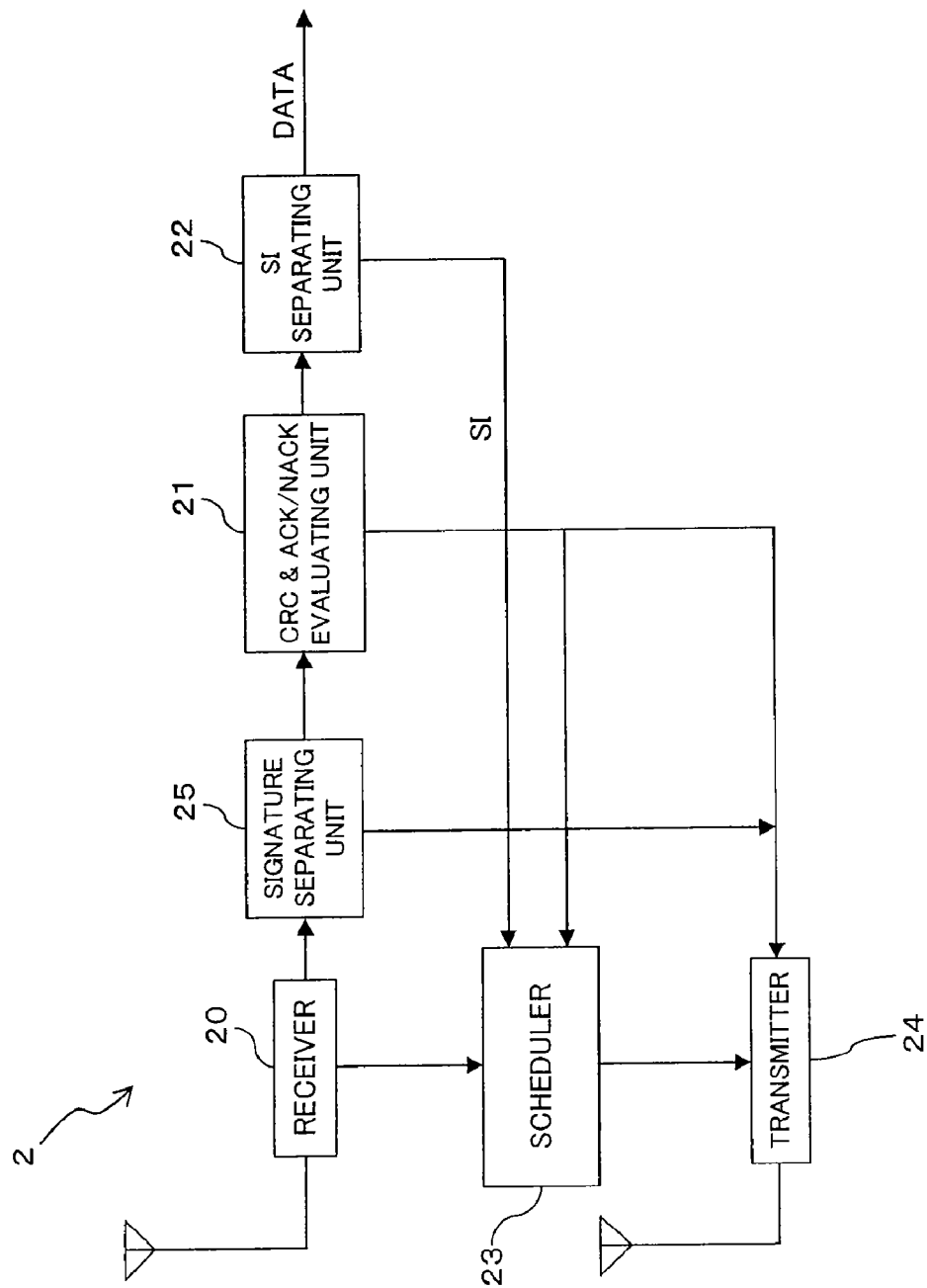
FIG. 6 is a block diagram showing a construction of a radio base station, which is a constituent of the mobile communication system according to the second embodiment of the present invention.

FIG. 5 is a block diagram showing a construction of a radio mobile station, which is a constituent of a mobile communication system according to a second embodiment of the present invention; FIG. 6 is a block diagram showing a construction of a radio base station, which is a constituent of the same system. The mobile station 1 of FIG. 5 is also capable of accessing the base station 2 of FIG. 6 by radio for establishing communication therebetween. In this case, also, downlink communication, from the base station 2 to the mobile station 1, is performed, for example, based on the HSDPA scheme, and uplink communication, from the mobile station 1 to the base station 2, is performed, for example, based on the HSUPA scheme.

The mobile station 1 of FIG. 5 differs from the mobile station 1 of FIG. 1 in that a signature generating unit 18 is added thereto. The base station 2 of FIG. 6 differs from the base station 2 of FIG. 2 in that a signature separating unit 25 is added thereto.

Figure 8:
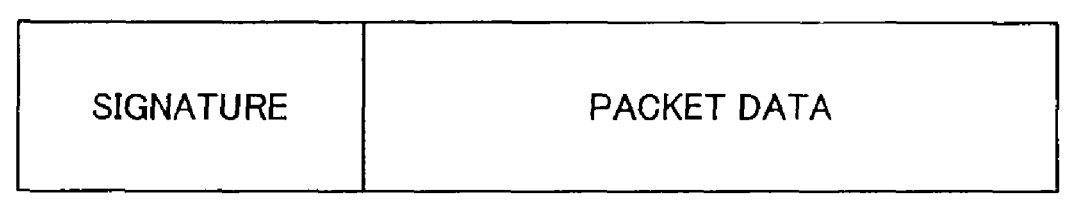

Here, the signature generating unit 18 of the mobile station 1 generates a signature (information identifying each mobile station 1) as physical layer information contained in a random access signal (a channel establishment request to the base station 2 for establishing an dedicated channel for transmitting scheduling information, which is a transmission request, therethrough) to be transmitted to the base station 2 through a common channel at the start of data transmission. In the present example, as shown in FIG. 8, for example, a signal (data packet) in which uplink user data is added to the generated signature is transmitted by the transmitter 14.

In other words, the signature generating unit 18 and the transmitter 14 serve as a transmitter means for transmitting the above channel establishment request and also as an uplink data adding means for adding uplink data to the channel establishment request. Here, the signature generating unit 18 is not used (does not operate) in uplink data transmission other than a random access signal.

The signature separating unit 25 of the base station 2 separates and extracts the above signature from the data packet received by the receiver 20. From this signature, a mobile station 1 which has transmitted the received data packet is identified, and the transmitter 24 sends back a reply to the random access signal to the identified mobile station 1.

Figure 7:
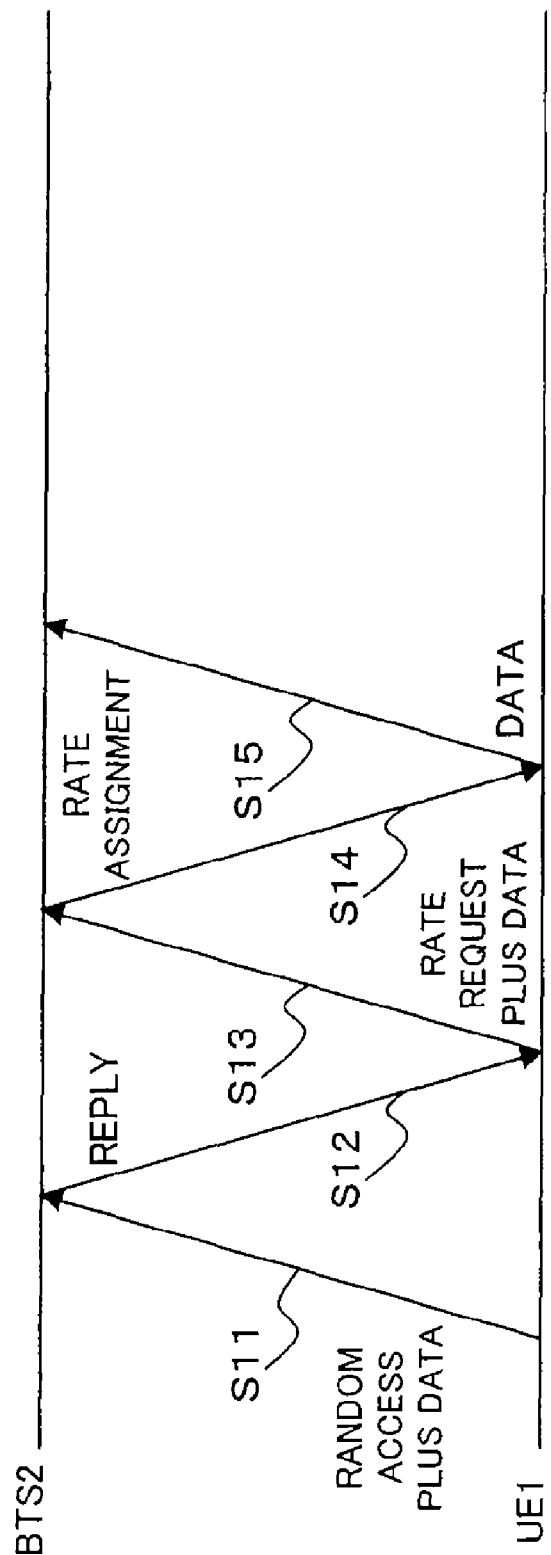
FIG. 7 is a sequence diagram for describing an operation (uplink communication method) of a mobile communication system of the second embodiment.

Now, referring to FIG. 7, a description will be made hereinbelow of an operation of a mobile communication system of the present embodiment with the above-described construction. At execution of HSUPA, the mobile station (UE) 1 generates a signal (see FIG. 8) in which uplink data (user data) is added to a random access signal including a signature at the start of data transmission, and then sends the generated signal to the base station (BTS) 2 through a common channel (step S11). Upon receipt of this signal on the base station 2, the signature separating unit 25 separates and extracts the signature, based on which a mobile station 1 which has transmitted the above random access signal is identified, and a reply to the random access signal is transmitted to the identified mobile station 1 (step S12). As a result, a communication path is established over a common channel between the mobile station 1 and the base station 2.

Figure 3:
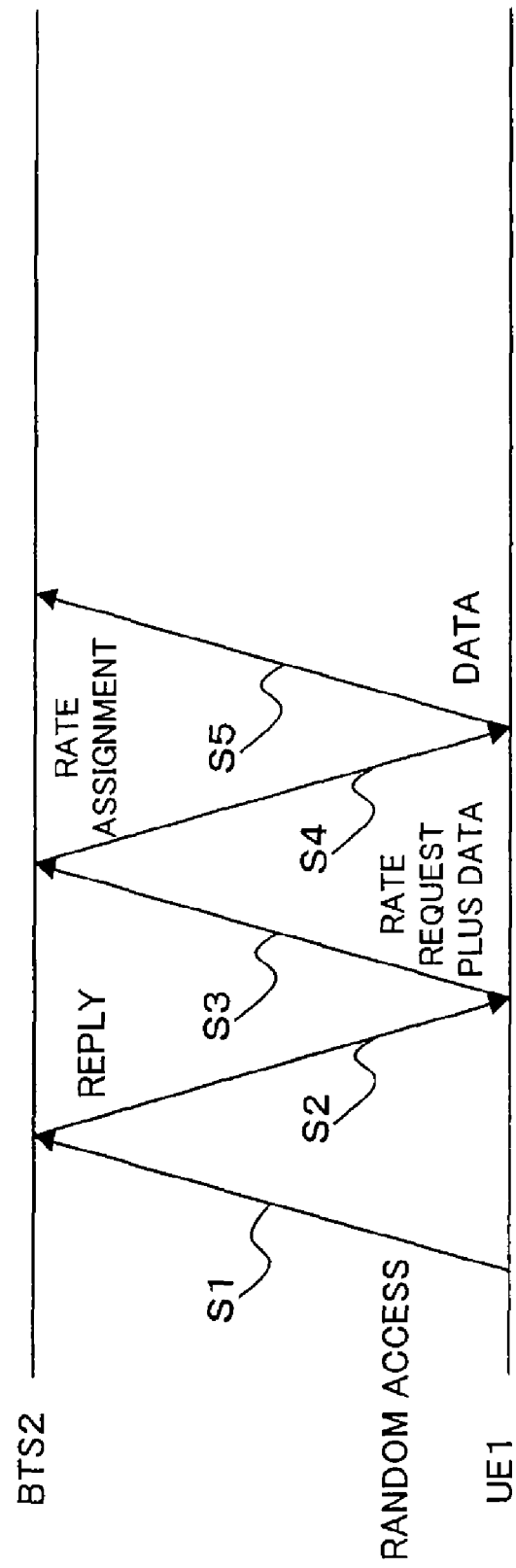
FIG. 3 is a sequence diagram for describing an operation (uplink communication method) of a mobile communication system of the first embodiment.

After that, as in the case of FIG. 3, upon receipt of the above reply, the mobile station 1 generates a signal (data packet) in which scheduling information (transmission rate assignment request) is added to the uplink transmission user data in order to request the base station 2 to establish (set) a dedicated channel, and then transmits the generated signal to the base station 2 through the common channel (step S13). The base station 2 sends back a transmission rate assignment reply to the mobile station 1 (step S14), and the mobile station 1 sends an uplink data packet at the rate assigned by the transmission rate assignment reply (step S15).

In this example, as described above, uplink data (user data) is added also to a random access signal sent from the mobile station 1 to the base station 2, so that it is possible to further reduce delay until the initial transmission in comparison with the first embodiment. Here, a channel used in random access is normally a common channel, whose transmission rate is lower than that of dedicated channels, so that the amount of user data to be added is limited. However, since the delay until the initial transmission is more reduced in comparison with the first embodiment, further improvement in throughput is expected.

Here, although uplink data is added to both the random access signal and the transmission rate request (scheduling information) in the present example, uplink data may be added only to the random access signal. In this case, the time until the start of uplink data transmission can still be reduced in comparison with the prior art, so that improvement in throughput is expected.

(B1) Modified Example of Second Embodiment

In the foregoing second embodiment, it is possible for the base station 2 to notify the mobile station 1 of ACK/NACK with respect to uplink packet transmission from the mobile station 1 together with permission/non-permission for the following uplink transmission (transmission rate assignment permission/non-permission). More precisely, as shown in FIG. 10, the transmitter 24 is capable of generating a signal (data packet) in which transmission rate permission/non-permission information is added to ACK/NACK information to be transmitted to the mobile station 1 (step S14' of FIG. 9).

Figure 9:
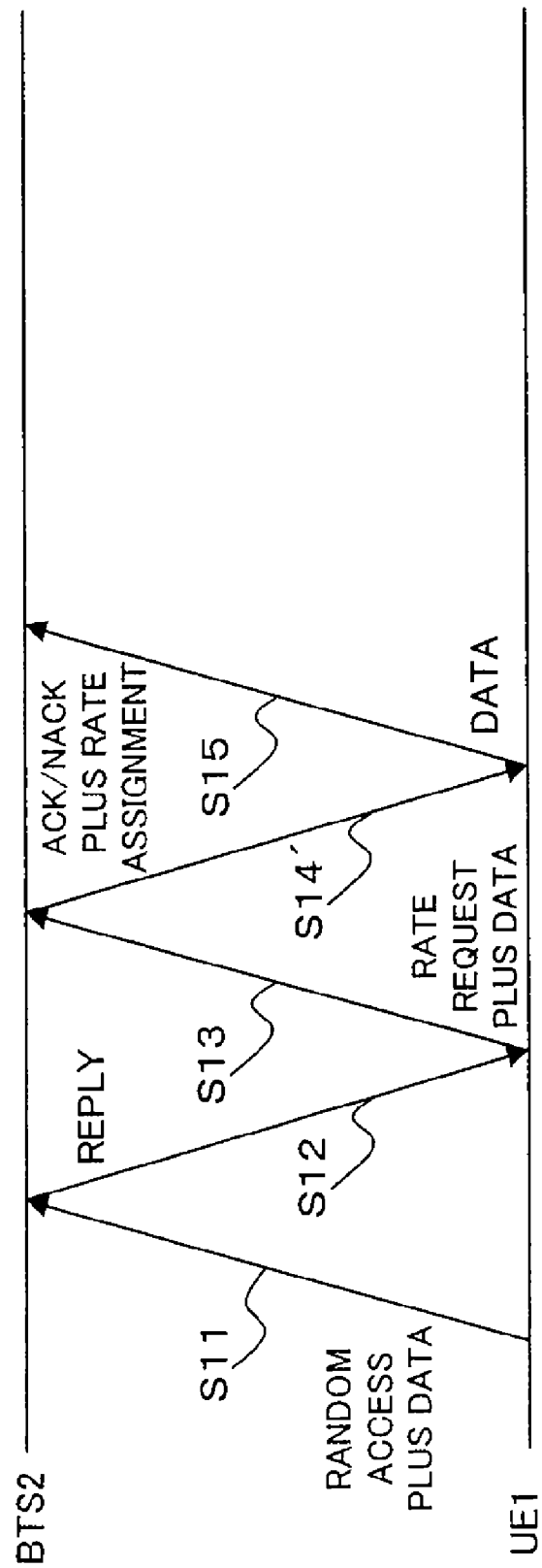
FIG. 9 is a sequence diagram for describing an operation (uplink communication method) of a mobile communication system according to a modified example of the second embodiment.

In other words, the transmitter 24 functions as a reply information transmitter means for transmitting reply information (ACK/NACK), which indicates whether or not an uplink data packet has been normally received from the mobile station 1, to the mobile station 1. The scheduler 23 functions as a notification information adding means for adding transmission permission/non-permission information, in response to a transmission request from the mobile station 1, to the reply information. Note that the other procedures in FIG. 9 are the same as or similar to those of FIG. 7.

This arrangement will simplify the procedures of downlink transmission. More precisely, ACK/NACK and uplink transmission rate assignment permission/non-permission are conventionally defined to be performed in different radio channels. For example, in HSUPA, ACK/NACK is transmitted through an E-HICH {E-DCH (Enhanced-Dedicated CHannel) HARQ (Hybrid Automatic Repeat reQuest) Acknowledgement Indicator Channel}; assignment permission/non-permission is transmitted through an E-AGCH (E-DCH Absolute Grant Channel) or an E-RGCH (E-DCH Relative Grant Channel). In contrast, in the present example, ACK/NACK and transmission rate permission/non-permission can be notified to the mobile station 1 through the same channel at the same time. Accordingly, the time until the start of data transmission is reduced, thereby improving throughput.

(C) Third Embodiment

In the above embodiments, the base station 2 monitors (measures) an uplink communication state based on the amount of uplink traffic and the amount of interference. If the traffic amount or the interference amount is below a specific amount (reference value), each mobile station 1 is notified to that effect, thereby making it possible for each mobile station 1 to perform uplink transmission without prior permission of the base station 2.

Figure 11:
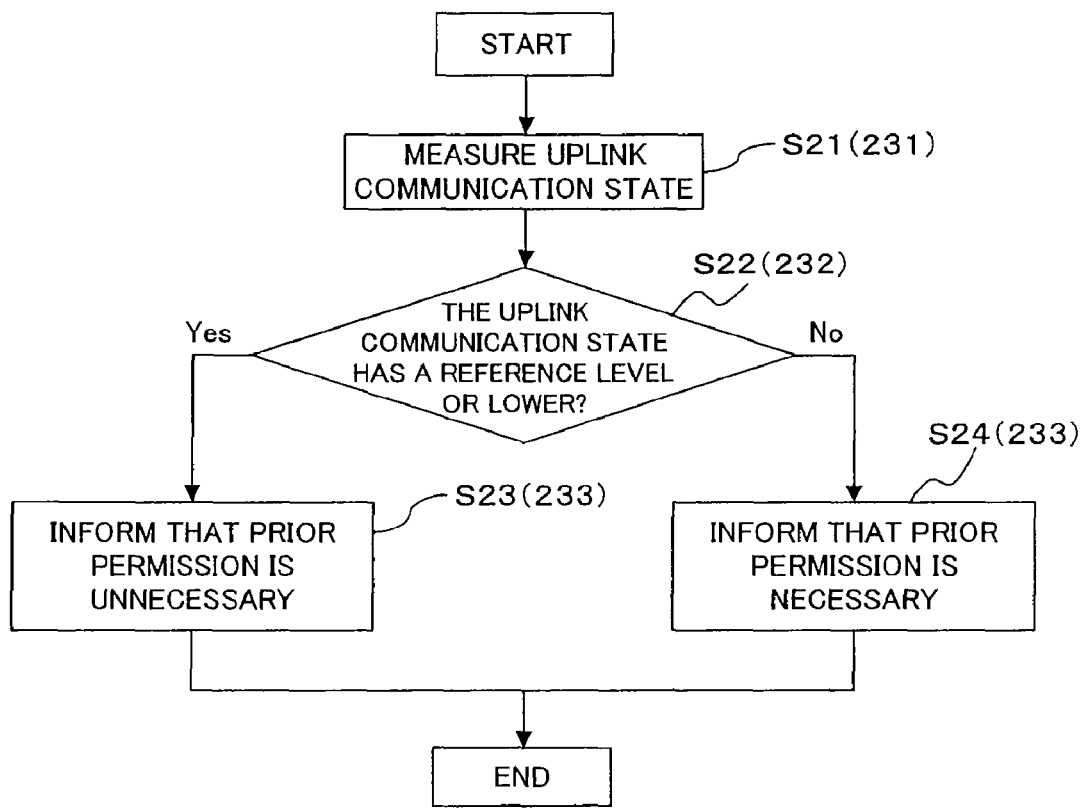
FIG. 11 is a flowchart for describing an operation of a base station in a mobile communication system according to a third embodiment of the present invention.

That is, as shown in FIG. 11, the base station 2 monitors an uplink communication state based on the traffic amount and the interference amount (step S21), and evaluates whether or not the traffic amount and the interference amount are not greater than a specific amount (reference value) (step S22). If those amounts are not greater than the reference value, the base station 2 judges that the uplink communication state is good, and notifies each mobile station 1 that prior permission is not necessary before starting of data transmission (from Yes route of step S22 to step S23). If those amounts are greater than the reference value, the base station 2 judges that the uplink communication state is not good, and then notifies each mobile station 1 that prior permission is necessary before starting of data transmission (from No route of step S22 to step S24).

In other words, the base station 2 selectively switches between a mode (first mode) in which uplink data transmission can be performed without prior permission and another mode (second mode) in which uplink data transmission can be performed only after prior permission given. Such a function is given to the above-described scheduler 23. In this case, the scheduler 23 has the following functions:

(1) a function as a communication state monitoring means 231 which monitors an uplink communication state between the base station 2 and the mobile station 1 by executing the above step S21;

(2) a function as an evaluating means 232 which evaluates whether or not the quality of an uplink communication state is a specific level or higher by executing the above step S22;

(3) a function as a mode selecting means 233 which selectively executes the above steps S23 and S24, thereby selecting the foregoing first mode as an operation mode if the evaluating means 232 judges that the quality of the uplink communication state is not lower than a specific level, and selecting the foregoing second mode as an operation mode if the evaluating means 232 judges that the quality of the uplink communication state is lower than a specific level.

With this arrangement, under a condition where the uplink communication state is good, the procedures which were necessary in uplink data transmission are eliminated, so that delay until data transmission is also eliminated, thereby improving throughput.

(C1) First Modified Example of Third Embodiment

Assuming that each mobile station 1 receives a notification of a mode in which the mobile station 1 can start data transmission without obtaining prior permission from the base station 2, and that the mobile station 1 starts uplink packet transmission without permission of the base station 2, there is a possibility that a collision happens between the uplink transmission (data packets) from more than one mobile station 1. In such a case, the collided data packets are discarded on the base station 2. At this time, the mobile station 1 normally performs retransmission after waiting a random period. This makes it possible to lower the possibility of a collision at the time of retransmission performed, but there is another possibility that delay until the retransmission is enlarged.

Figure 12:
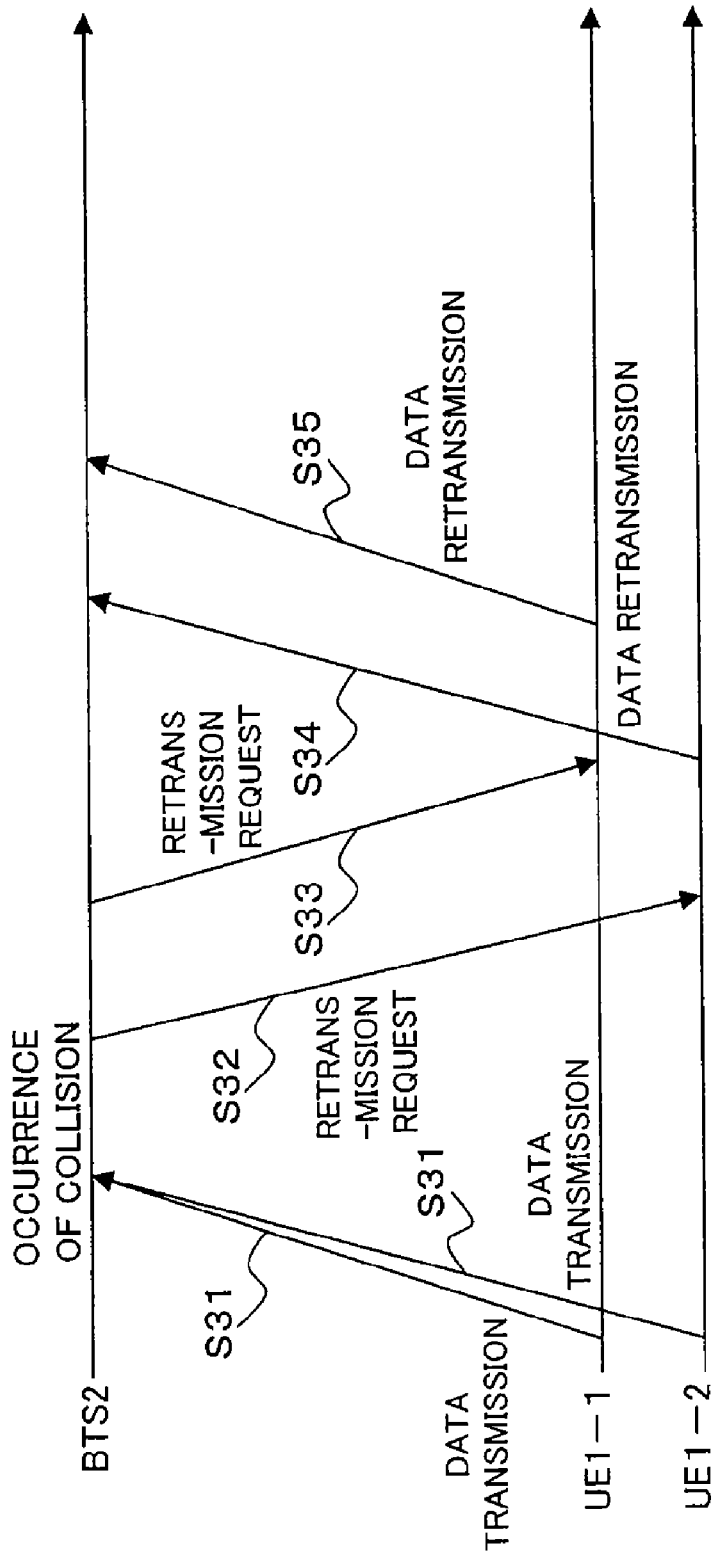
FIG. 12 is a sequence diagram for describing an uplink communication method according to a first modified example of the third embodiment.

Therefore, in the present example, if mobile stations 1 that have simultaneously transmitted the collided packets can be identified, the base station 2 requests the mobile stations 1 to retransmit the packets. More precisely, as shown in FIG. 12, it is assumed that the mobile stations 1-1 and 1-2 simultaneously transmit uplink data (step S31), and that a collision occurs on the base station 2. Here, note that each of the mobile stations 1-1 and 1-2 performs uplink data transmission using a frame format including a signature, as already described with reference to FIG. 8.

If the mobile stations 1-1 and 1-2 which have transmitted the collided data packets are identifiable from the above signature, the base station 2 sends a retransmission request to the mobile stations 1-1 and 1-2 at different timings (steps S32 and S33). This makes the mobile stations 1-1 and 1-2 transmit uplink data at different timings (steps S34 and S35).

The foregoing operation is realized on the base station 2 by the scheduler 23 which functions as an uplink data collision monitoring means and the transmitter 24 which functions as a retransmission timing notifying means. The scheduler 23, as an uplink data collision monitoring means, monitors whether or not a collision occurs between uplink data transmission from two or more mobile stations 1 while the base station 2 is operating in the foregoing first mode. If a collision is detected by the uplink data collision monitoring means, the transmitter 24, as a retransmission timing notifying means, notifies the mobile stations that have transmitted the collided uplink data of timings for retransmitting the uplink data.

With this arrangement, it is possible to minimize delay in uplink data transmission and to reliably avoid a collision when the uplink data is retransmitted.

(C2) Second Modified Example of Third Embodiment

Figure 13:
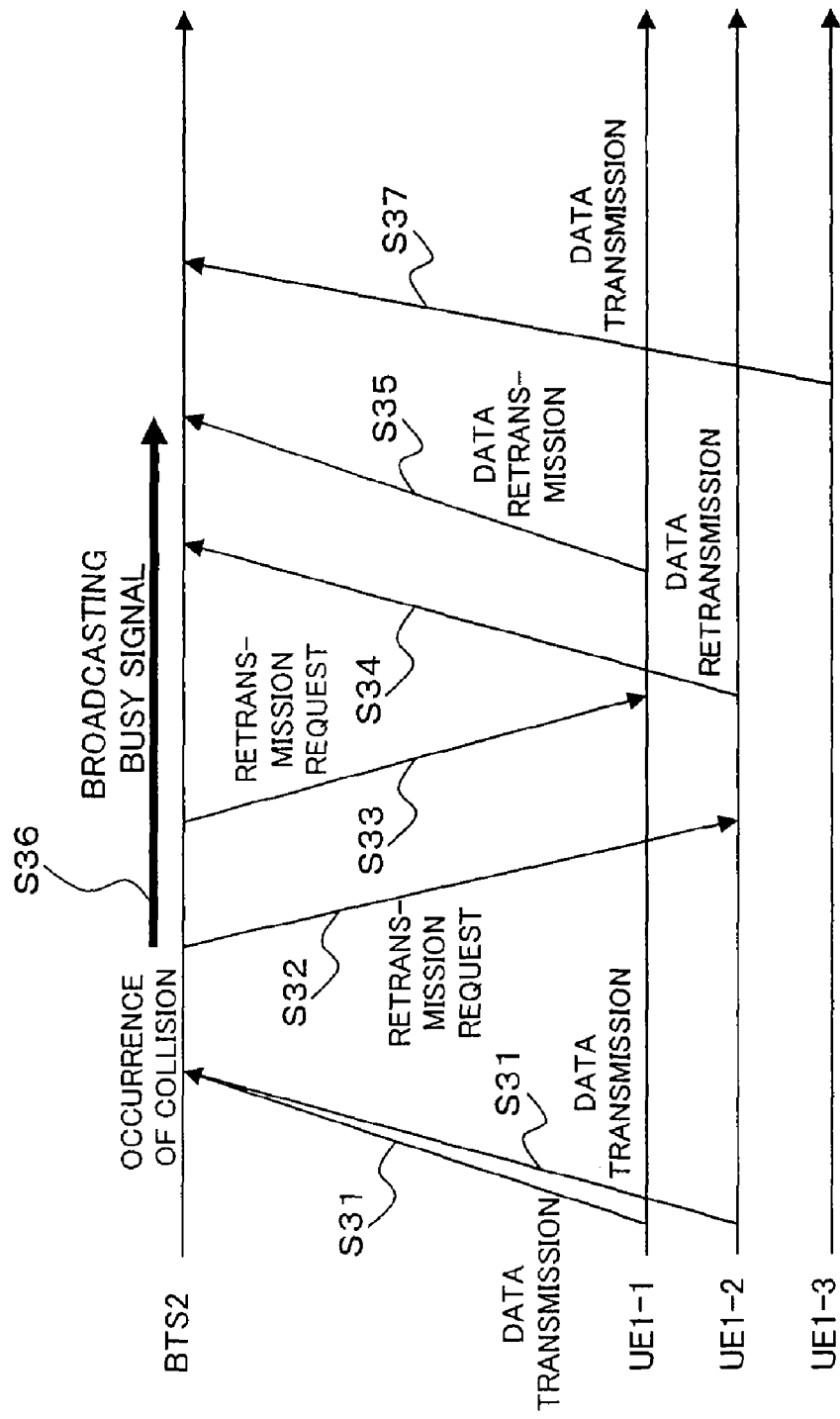
FIG. 13 is a sequence diagram for describing an uplink communication method according to a second modified example of the third embodiment.

While the base station 2 is waiting for data retransmission from the mobile stations 1-1 and 1-2, it is preferable that the base station 2 broadcast a busy signal to prevent other mobile stations from transmitting data. More specifically, as shown in FIG. 13, when the base station 2 sends retransmission requests to the mobile stations 1-1 and 1-2 due to a collision which has occurred between the uplink transmission data packets of the mobile stations 1-1 and 1-2 (steps S32 and S33), the base station 2 broadcasts a busy signal through, for example, a common channel until retransmission from the mobile stations 1-1 and 1-2 (steps S34 and S35) is performed (or during a period in which retransmission is expected)(step S36).

In other words, the base station 2 functions as a busy state informing means which informs each mobile station 1 within its cell of a busy state during a time period in which uplink data retransmission is expected from the relevant mobile stations 1 based on a notification of retransmission timing sent by the transmitter 24 as the retransmission timing notifying means. This function may be also given to the scheduler 23.

While receiving the busy signal, another mobile station 1-3 refrains from uplink data transmission. After transmission of the busy signal from the base station 2 is ended, so that the busy signal is no longer received, the mobile station 1-3 starts uplink data transmission (step S37). This arrangement makes it possible to further lower the possibility of a collision of uplink transmission data packets.

(C3) Third Modified Example of Third Embodiment

Here, the length of data packets transmitted from the mobile stations 1-1, 1-2, and 1-3 (hereinafter will be called the "mobile station 1" when no distinction is made thereamong) and the base station 2 are preferably fixed. This makes it easy for the mobile station 1 to recognize with which timing retransmission should be performed when a collision of uplink data transmission happens on the base station 2.

(C4) Fourth Modified Example of Third Embodiment

Figure 14:
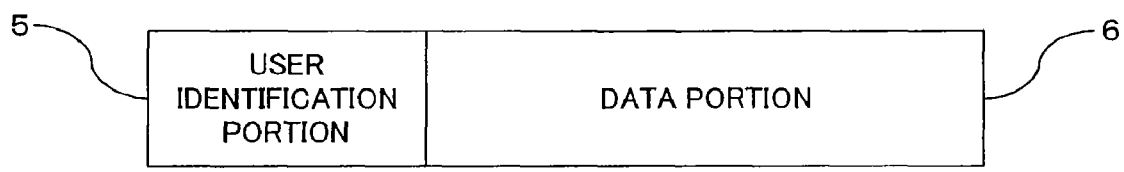
FIG. 14 is a diagram showing a data packet construction according to a fourth modified example of the third embodiment.

As shown in FIG. 14, a data packet transmitted from the mobile station 1 has a user identification portion 5 identifying each user and a data portion 6 which is a message body. That is, the mobile station 1 has a function of an uplink data generating means which generates an uplink data packet having a user identification portion 5 identifying each mobile station 1 and a data portion 6 which is a message body, and also a function of an uplink data transmitter means which transmits the uplink data generated by the uplink data generating means to the base station 2. These functions are realized as one of the functions of the transmitter 14. In this case, the mobile station 1 is capable of performing stronger error correction processing to the user identification portion 5 than to the data portion 6.

With this arrangement, even if uplink data packets sent from different mobile stations 1 collide on the base station 2, it is highly likely that the base station 2 is capable of decoding at least information of the user identification portion 5. Thus, if decoding of information of the data portion 6 is unavailable, it is possible to identify which mobile stations 1 have sent the data packets that have collided.

(C5) Fifth Modified Example of Third Embodiment

Figure 15:
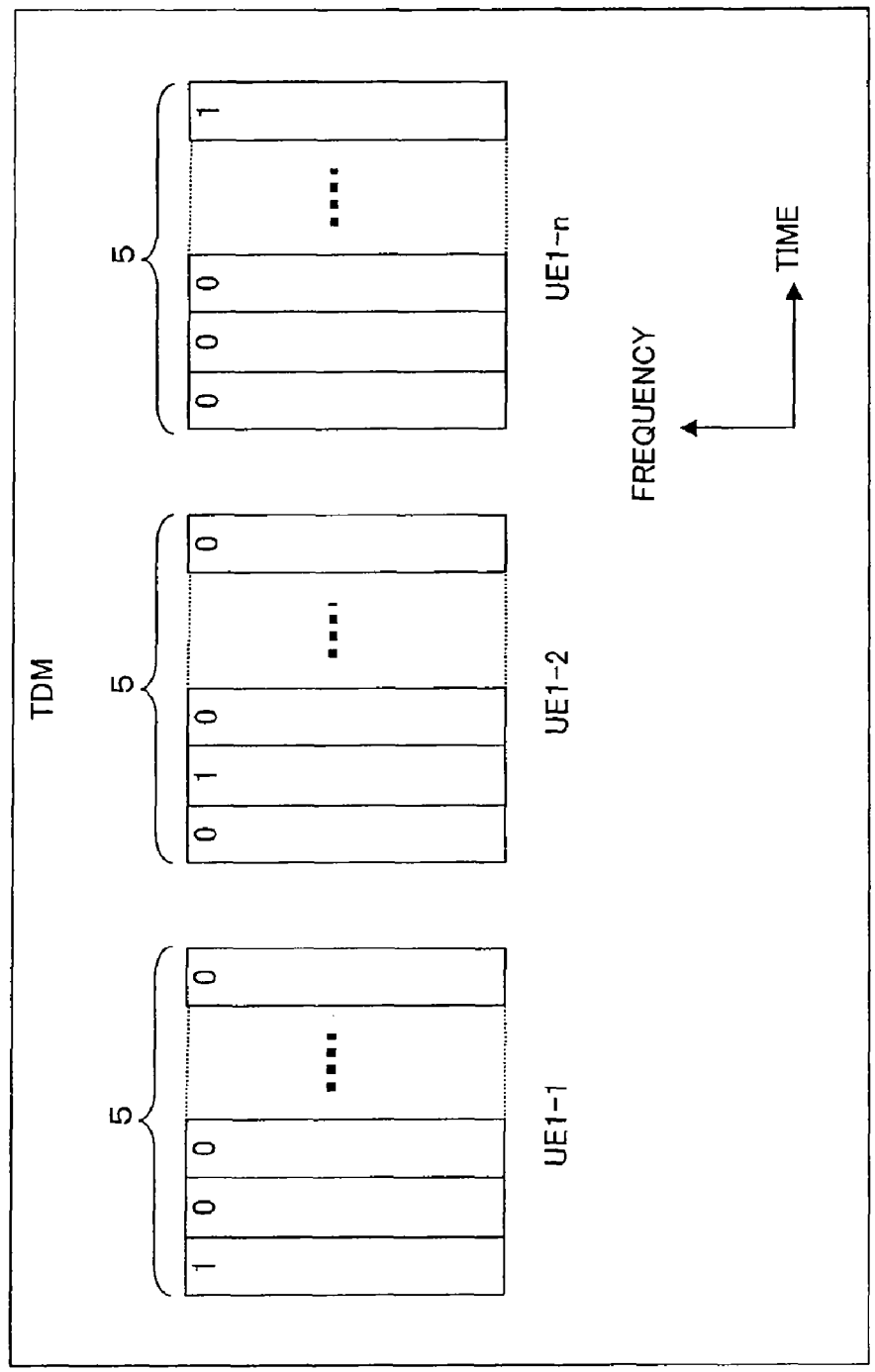
FIG. 15 is a diagram showing a construction of the user identification portion (time-division multiplexed) illustrated in FIG. 14.
Figure 16:
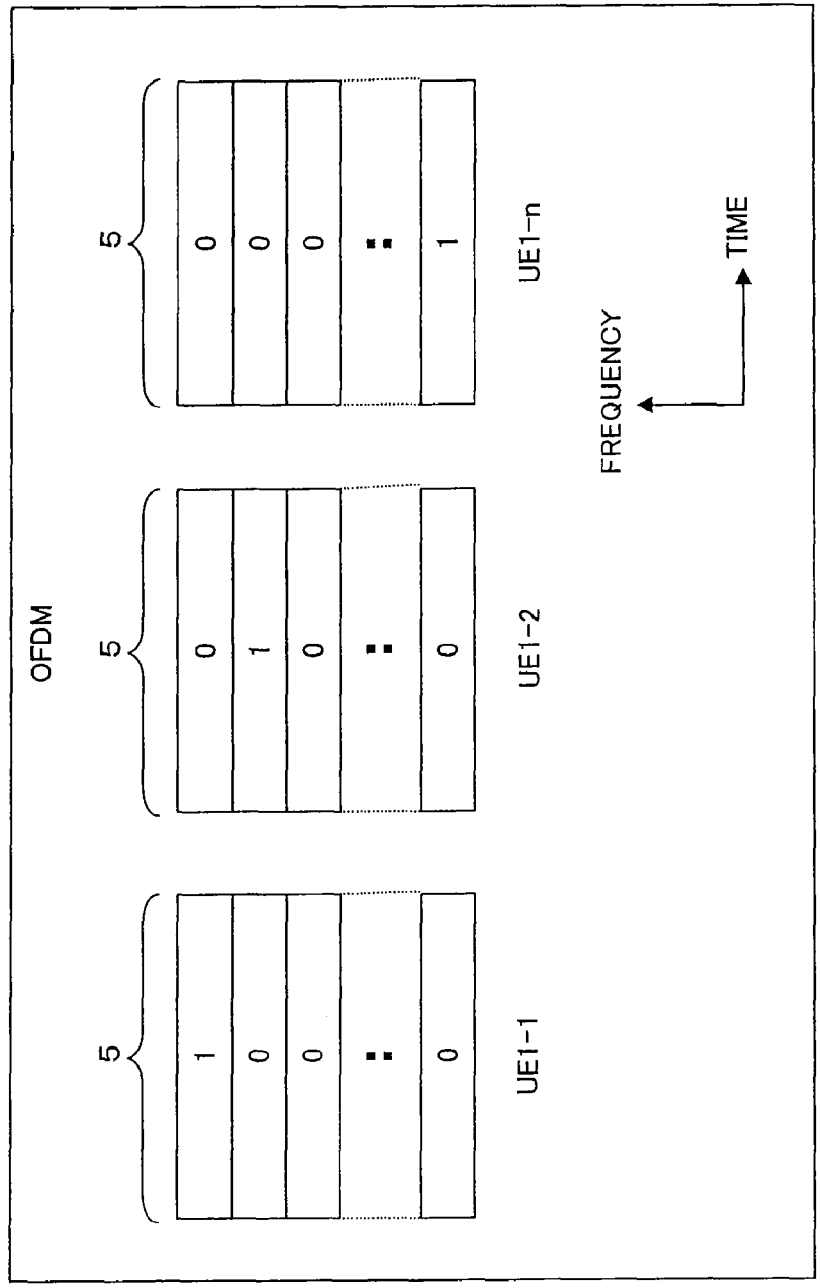
FIG. 16 is a diagram showing a construction of the user identification portion (frequency-division multiplexed) illustrated in FIG. 14.
Figure 17:
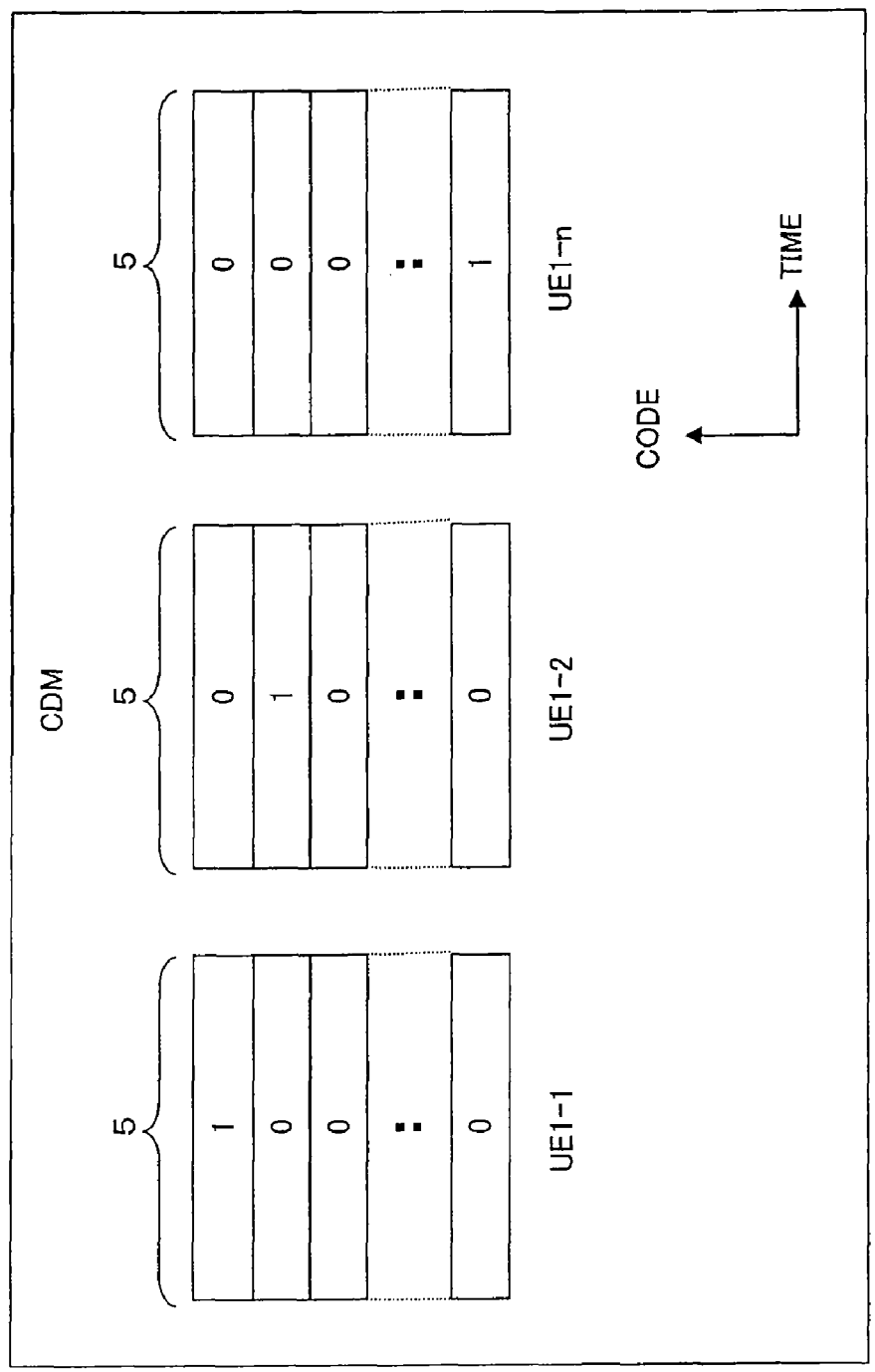
FIG. 17 is a diagram showing a construction of the user identification portion (code-division multiplexed) illustrated in FIG. 14.

Further, the user identification portion 5 can be separated into small divisions in the time axis direction, thereby being time-division multiplexed (TDM), as shown in FIG. 15, or it can be separated in the frequency direction, thereby being orthogonal frequency-division multiplexed (OFDM), as shown in FIG. 16, or it can be code-division multiplexed (CDM). This makes it highly likely that even if a collision of uplink data packets transmitted from different mobile stations 1 occurs, the base station 2 is capable of decoding at least information of the user identification portion 5. As a result, it is possible to evaluate which mobile stations 1 have transmitted the uplink data packets that collided.

(C6) Sixth Modified Example of Third Embodiment

Next, on the assumption that when data packets transmitted from different mobile stations 1 collides, the base station 2 can identify the mobile stations 1 (users) based on information of the user identification portions 5, and that information of one of the data portions 6 is normally decoded, a description will be made hereinbelow of a method which makes it possible to evaluate which user (mobile station 1) the decoded data portion 6 corresponds to.

(C6.1) First Mode of Sixth Modified Example

Figure 18:
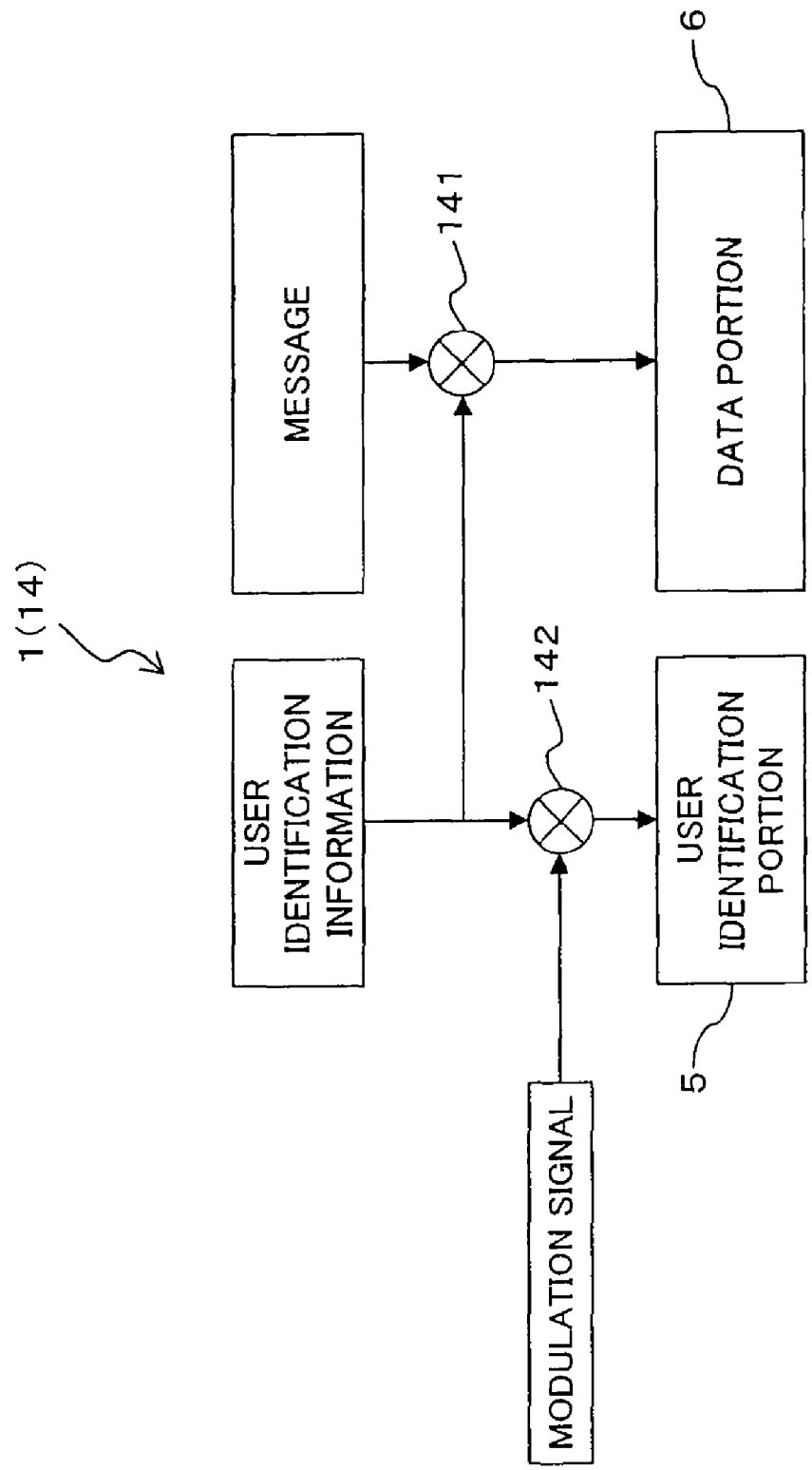
FIG. 18 is a diagram for describing a method for encoding a data portion on a mobile station according to a first mode of a sixth modified example of the third embodiment.

In this example, as shown in FIG. 18, the mobile station 1 (transmitter 14: see FIG. 1 and FIG. 5) encodes {performs multiplication by a multiplier (encoding means) 141 or an exclusive OR operation} a message to be stored in a data portion 6 using information (user identification information) of a user identification portion 5, and the encoded information is stored in the data portion 6. The user identification portion 5 stores a signal obtained by multiplying the above user identification information and the modulation signal together by means of a multiplier 142. This method makes it possible to make the user identification information contained (superposed) in the data portion 6 without significantly reducing the data amount in the data portion 6.

Figure 19:
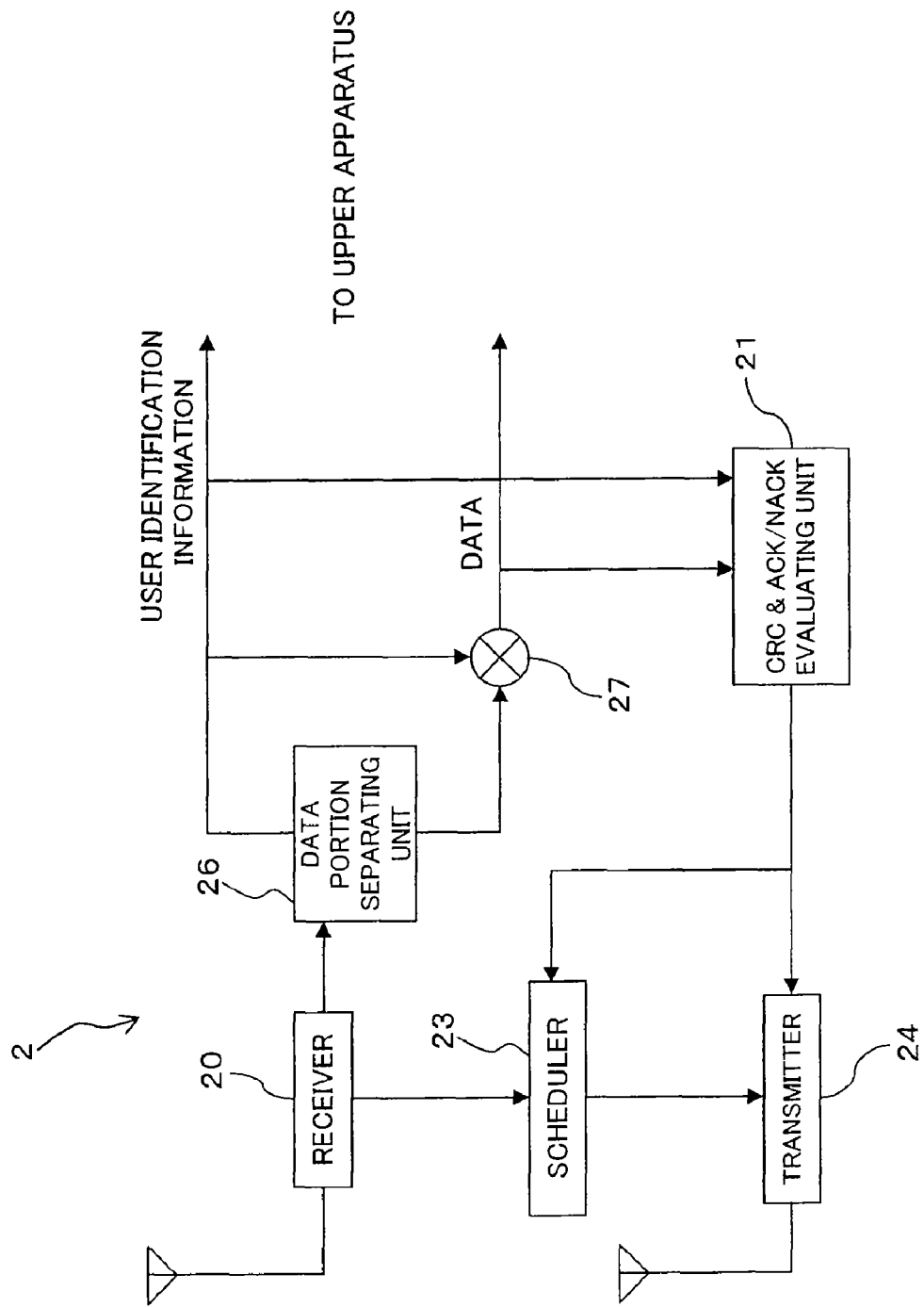
FIG. 19 is a block diagram showing a construction of a base station corresponding to the mobile station of FIG. 18.

Such encoding necessitates the user identification information for decoding (reproducing) the data portion, and thus the base station 2 needs to decode the user identification portion 5 prior to the data portion 6. In this case, as shown in FIG. 19, the base station 2 includes: a data portion separating unit 26 which separates the user identification portion 5 and the data portion 6 from an output (an uplink data packet received) of the receiver (receiver means) 20; and a multiplier 27 which multiplies information of the user identification portion 5 and information of the data portion 6, separated by the data portion separating unit 26, together, to decode (reproduce) information of the data portion 6 (message body). Here, in FIG. 19, like reference numbers and characters designate similar parts or elements throughout several views of the embodiments, unless otherwise described.

With this arrangement, the base station 2 decodes the user identification portion 5 prior to the data portion 6, and using the decoded information, the base station 2 decodes information of the data portion 6. Accordingly, at a collision of data packets from different mobile stations 1, when information of the user identification portions 5 is correctly decoded, so that the mobile stations (users) 1 are identified, and also when information of one of the data portions 6 is correctly decoded, it is possible to decide which user (mobile station 1) the decoded data portion 6 corresponds to. As a result, it is possible to identify a mobile station 1 to which the above-mentioned retransmission request and ACK/NACK are to be transmitted.

(C6.2) Second Mode of Sixth Modified Example

Figure 20:
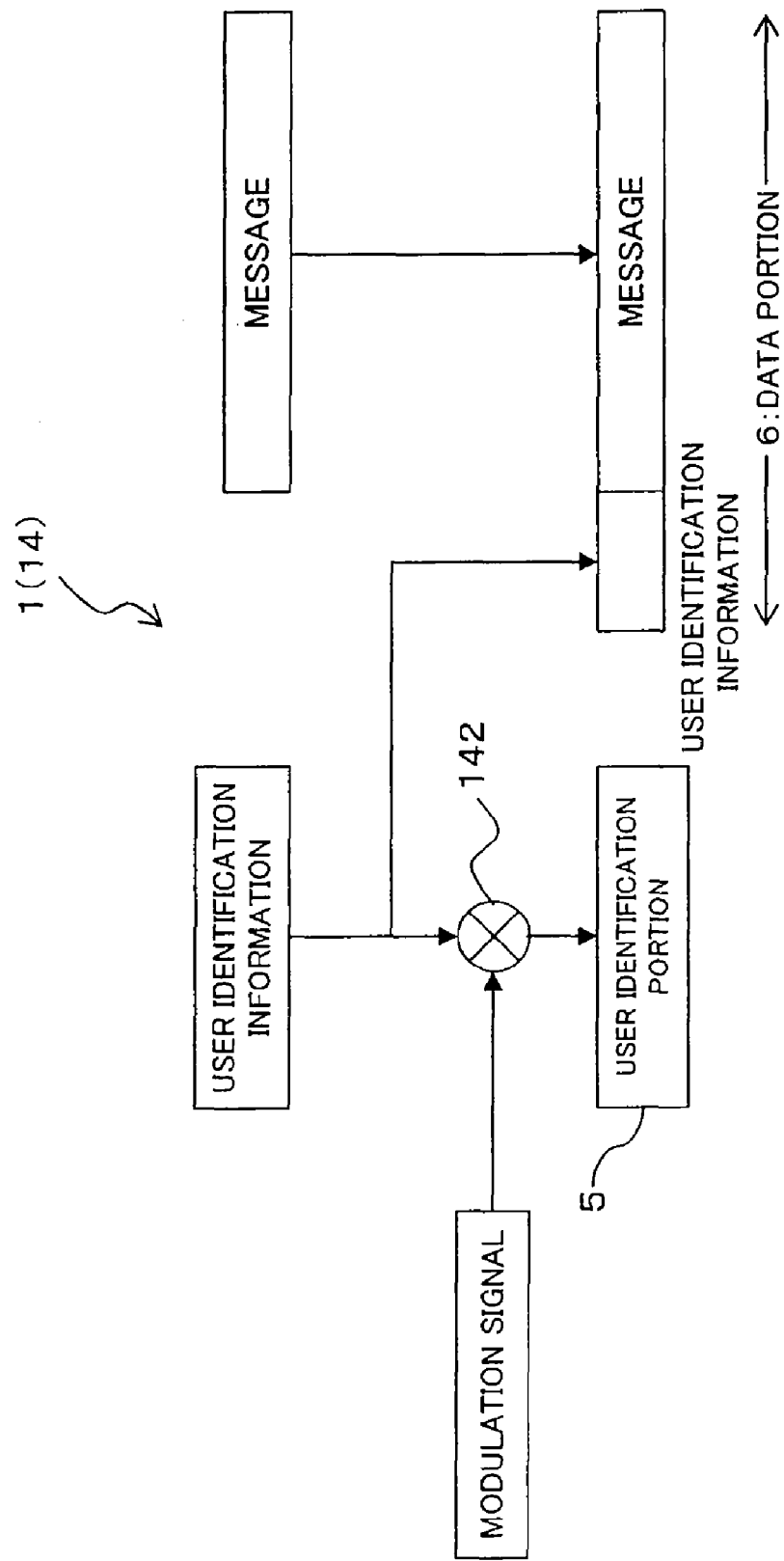
FIG. 20 is a diagram for describing a method for encoding a data portion on a mobile station according to a second mode of the sixth modified example of the third embodiment.
Figure 21:
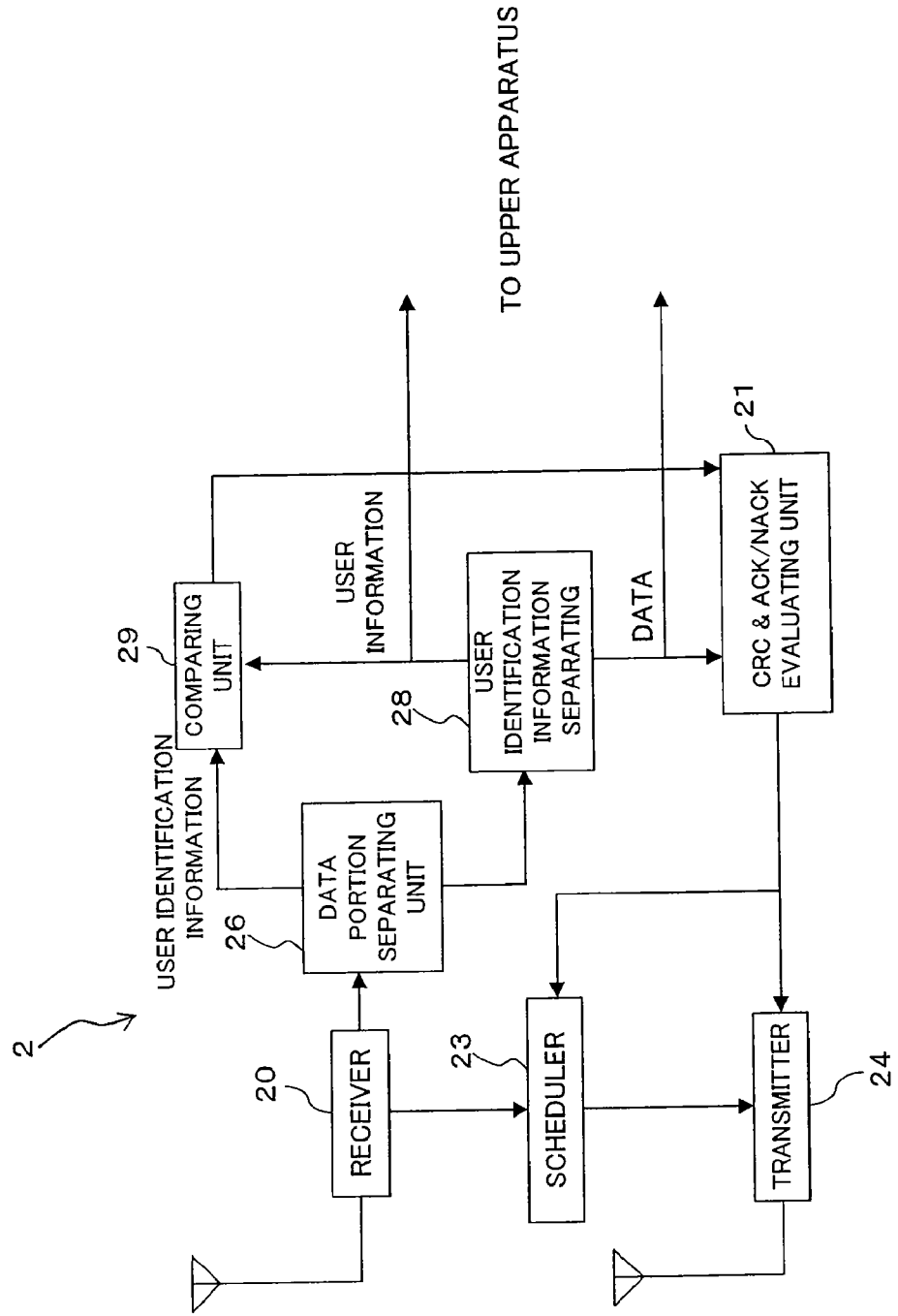
FIG. 21 is a block diagram showing a construction of a base station corresponding the mobile station of FIG. 20.

In this instance, as shown in FIG. 20, on the mobile station 1 (transmitter 14), user identification information, as it is, is contained (inserted) in a data portion 6 as a part thereof. That is, in this case, the transmitter 14 functions as an inserting means for inserting information of the user identification portion 5 into the data portion 6. This makes it possible to easily take out user identification information by decoding the information of the user identification portion 5 from the data portion 6 on the receiver end (base station 2). Here, as shown in FIG. 21, the base station 2 includes, as well as the data portion separating unit 26 already described: a user identification information separating unit 28 which separates user identification information from the data portion 6 that has been separated by the data portion separating unit 26; and a comparing unit 29 which compares user identification information separated by the user identification information separating unit 28 with user identification information separated by the data portion separating unit 26.

With this arrangement, on the base station 2, the data portion separating unit 26 separates the user identification portion 5 and the data portion 6 from an output (uplink data packet received) of the receiver (receiver means) 20, and the user identification information separating unit 28 further separates user identification information contained in the data portion 6, and the comparing unit 29 compares the user identification information separated by data portion separating unit 28 with the user identification information separated by the user identification information separating unit 26. Based on the comparison result (match/mismatch), the base station 2 is capable of deciding from which user (mobile station 1) the data portion 6 has been transmitted. As a result, a mobile station 1 to which the aforementioned retransmission request and ACK/NACK are to be transmitted is identified.

(C7) Seventh Modified Example of Third Embodiment

Concretely, when a user identification portion 5 and its corresponding data portion 6 are correctly received and decoded, the base station 2 transmits ACK to the mobile station 1. On the other hand, when only the user identification portion 5 is correctly received and decoded, the base station 2 transmits NACK to the mobile station 1. In addition, in cases where the method described in the above section (C6) is employed, and when the base station 2 correctly receives and decodes only a data portion 6, the base station 2 transmits ACK to the mobile station 1 because the user can be identified based on the user identification information contained in the data portion 6.

Figure 22:
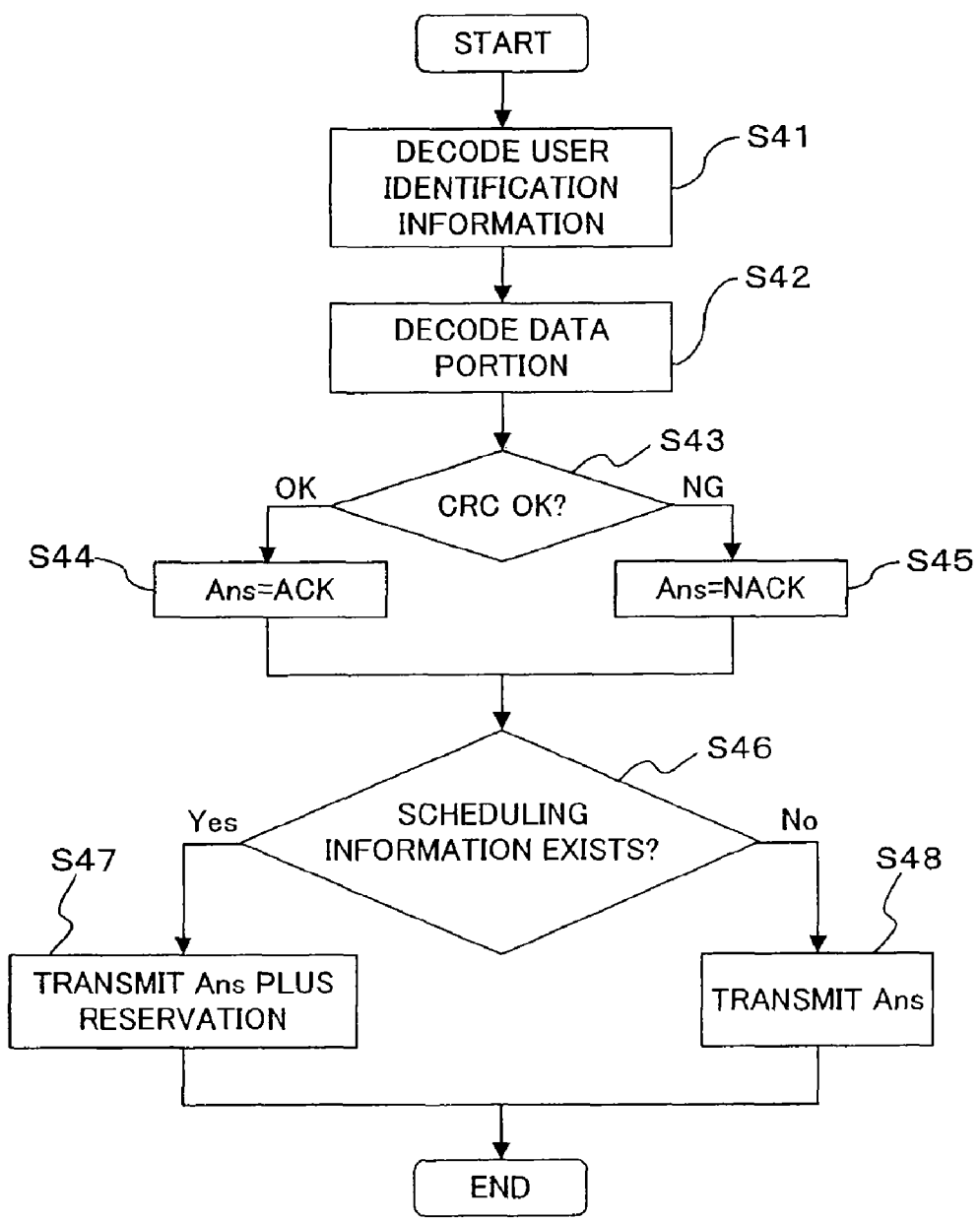
FIG. 22 is a flowchart for describing an operation of the base station of FIG. 19.
Figure 23:
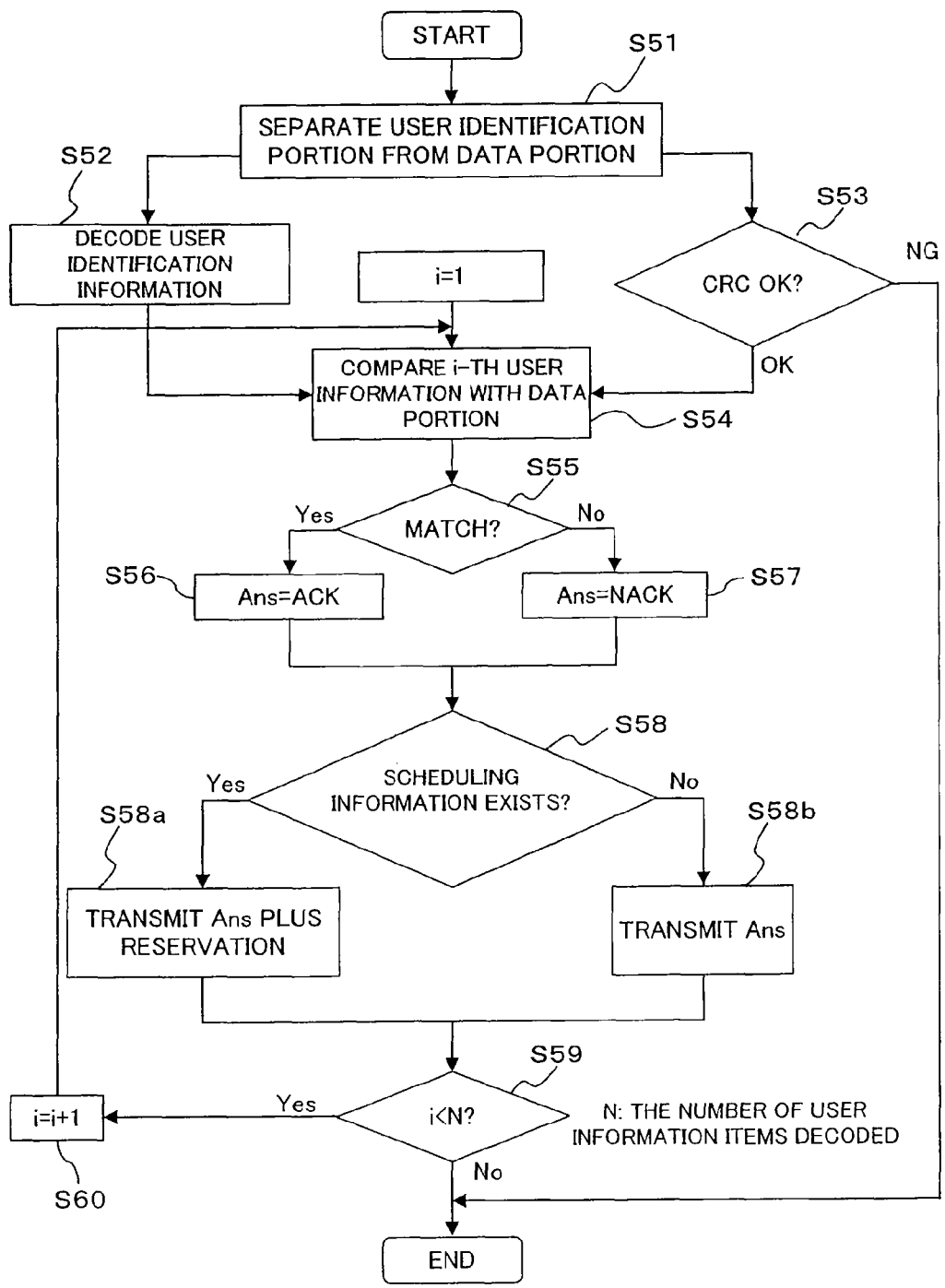
FIG. 23 is a flowchart for describing an operation of the base station of FIG. 21.

Here, when the base station 2 transmits ACK or NACK to the mobile station 1, the next scheduling information can be simultaneously (added) transmitted. FIG. 22 shows an operation of the base station 2 in which the method described in the above section (C6.1) is employed; FIG. 23 shows an operation of the base station 2 in which the method described in the above section (C6.2) is employed.

(C7.1) First Mode of Seventh Modified Example

When the mobile station 1 encodes a data portion 6 using user identification information at transmission of a data packet, as described in the above section (C6.1), the base station 2, as shown in FIG. 22, decodes a user identification portion 5 (step S41), and then decodes the data portion 6 (step S42). After that, the CRC and ACK/NACK evaluating unit 21 performs CRC (step S43). If the CRC reveals an "OK" result (a correct decoding result has been obtained), the base station 2 generates ACK (step S44), and if the check reveals a "NG" result (a correct decoding result has not been obtained), the base station 2 generates NACK (step S45).

Subsequently, on the base station 2, the scheduler 23 evaluates whether or not scheduling information (permission for the following data transmission) to be transmitted to the mobile station 1 exists (step S46). If such scheduling information to be transmitted is present, the scheduling information is transmitted to the mobile station 1 together with the above ACK or NACK (from Yes route of step S46 to step S47), and if the scheduling information to be transmitted is not present, the above ACK or NACK is transmitted to the mobile station 1 as it is (from No route of step S46 to step S48).

That is, if a data packet (user identification portion 5 and data portion 6) received from the mobile station 1 is correctly decoded, the base station 2 transmits permission for the following data transmission, together with ACK, to the mobile station 1 that has been identified based on the decoded user identification information. If a user identification portion 5 is correctly decoded but a data portion 6 is not correctly decoded, the base station 2 transmits permission for the following data transmission, together with NACK, to the mobile station 1 that has been identified based on the decoded user identification information.

In other words, the base station 2 of the present example realizes a function of a reply and transmission permission transmitter means which transmits, if the user identification portion 5 and the data portion 6 are correctly decoded by the scheduler 23 and the transmitter 24, permission for the following uplink data transmission, together with reply information ACK indicating normal reception, to a mobile station 1 identified by information of the user identification portion 5, and which reply and transmission permission transmitter means transmits, if the user identification portion 5 is correctly decoded and the data portion 6 is not correctly decoded, permission for the following uplink data transmission, together with reply information NACK indicating abnormal reception, to a mobile station 1 identified by information of the user identification portion 5.

With this arrangement, in comparison with a case in which ACK/NACK and the scheduling information are separately transmitted to the mobile station 1, the procedures of uplink data transmission are further simplified, so that delay in uplink data transmission is reduced, thereby further improving throughput.

(C7.2) Second Mode of Seventh Embodiment

As described in the above section (C6.2), when the mobile station 1 transmits a data packet in which user identification information is inserted in a data portion 6 thereof, the data portion separating unit 26 and the user identification information separating unit 28 (see FIG. 21) of the base station 2 separate, as shown in FIG. 23, a user identification portion 5 and a data portion 6 of the received data packet (step S51), and the user identification information is decoded (step S52), and the CRC and ACK/NACK evaluating unit 21 performs CRC (step S53).

If the CRC result reveals an "OK" result, the i-th user identification information, and user identification information contained in the data portion 6 are compared by the comparing unit 29, to evaluate if they match up (step S54 and step S55). If the two user identification information items match up, the base station 2 (CRC and ACK/NACK evaluating unit 21) generates ACK as a reply to the mobile station 1 (from Yes route of step S55 to step S56), and if the two do not match up, the base station 2 generates NACK (from NO route of step S55 to step S57).

After that, on the base station 2, the scheduler 23 evaluates whether or not scheduling information (permission for the following data transmission) to be transmitted to the mobile station 1 exists (step S58). If the scheduling information to be transmitted is present, the scheduling information is sent to the mobile station 1 together with the ACK or NACK (from Yes route of step S58 to step S58*a*). If the scheduling information to be transmitted is not present, the above ACK or NACK is transmitted to the mobile station 1 as it is (from No route of step S58 to step S58*b*).

After that, the base station 2 checks whether or not processing has been completed for data packets (the number of packet=N) received from all the users (mobile stations 1) decoded (i<N?: step S59). If the processing has not been completed, the value of i is incremented by 1 (i=i+1) (from Yes route of step S59 to step S60), the above processing of step S54 and thereafter is repeated to the (i+1) th user identification information item and its data portion, until the processing has been completed (until a "No" decision is obtained at step S59).

That is, on the base station 2, the scheduler 23 and the transmitter 24 realize a function of a reply and transmission permission transmitter means, which transmits, if the data portion 6 is correctly decoded, permission for the following data transmission to the mobile station 1 identified based on the decoded information (user identification information contained in the data portion 6), together with reply information ACK indicating normal reception, and which transmits, if the user identification portion 5 is correctly decoded but the data portion 6 is not correctly decoded, the permission for the following data transmission to the mobile station 1 identified by information of the user identification portion 5, together with reply information NACK indicating abnormal reception.

As described so far, in comparison with a case in which ACK/NACK and the scheduling information are separately transmitted to the mobile station 1, the procedures of uplink data transmission are further simplified, so that delay in uplink data transmission is reduced, thereby further improving throughput.

(C8) Eight Modified Example of Third Embodiment

Next, referring to FIG. 24, a description will be made hereinbelow of an operation of the mobile station 1 when the base station 2 transmits scheduling information together with ACK or NACK, as described in the above section (C7). The construction of the mobile station 1 is similar to that of FIG. 1.

Figure 24:
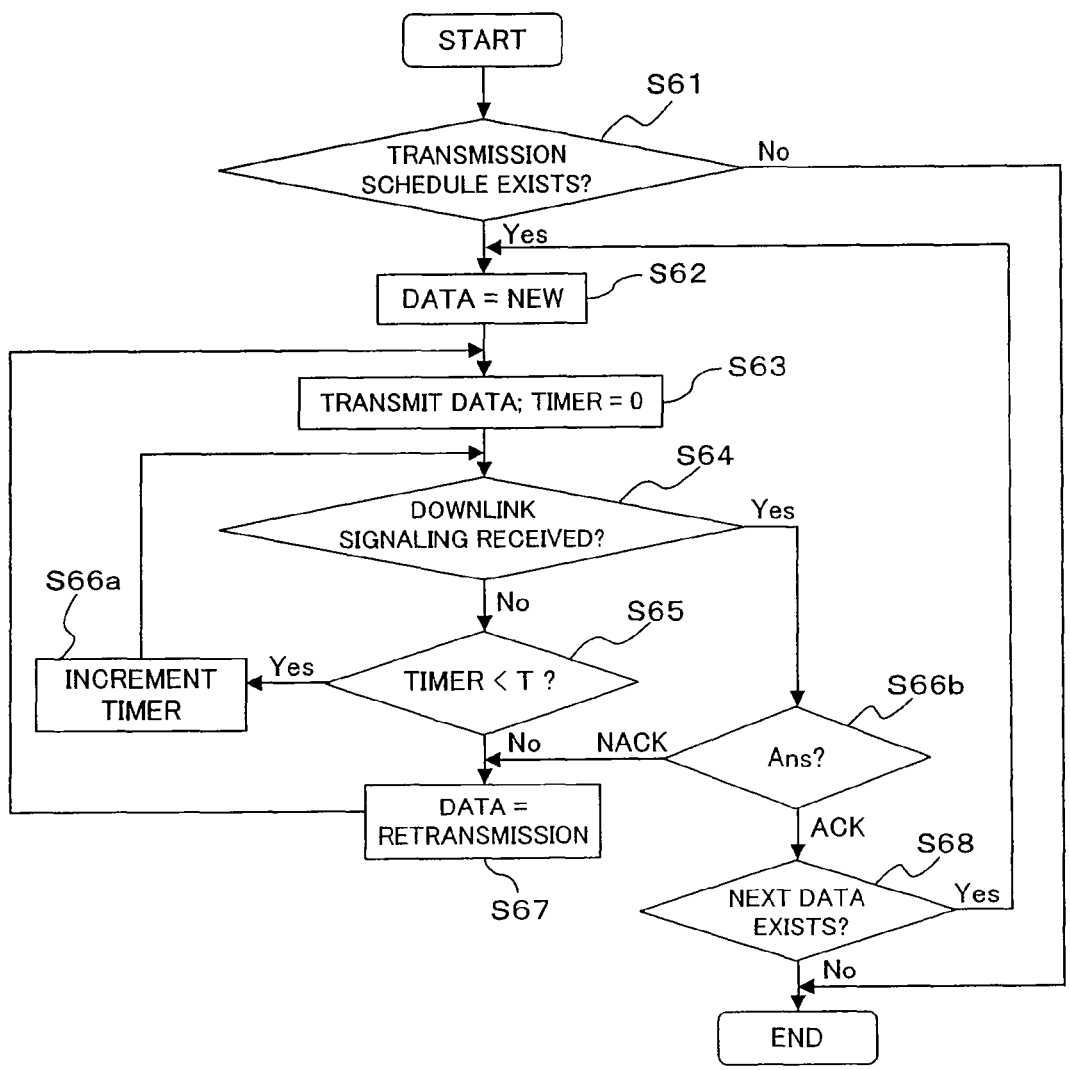
FIG. 24 is a flowchart for describing an operation of a mobile station corresponding to a base station shown in FIG. 19 or FIG. 21.
Figure 25:
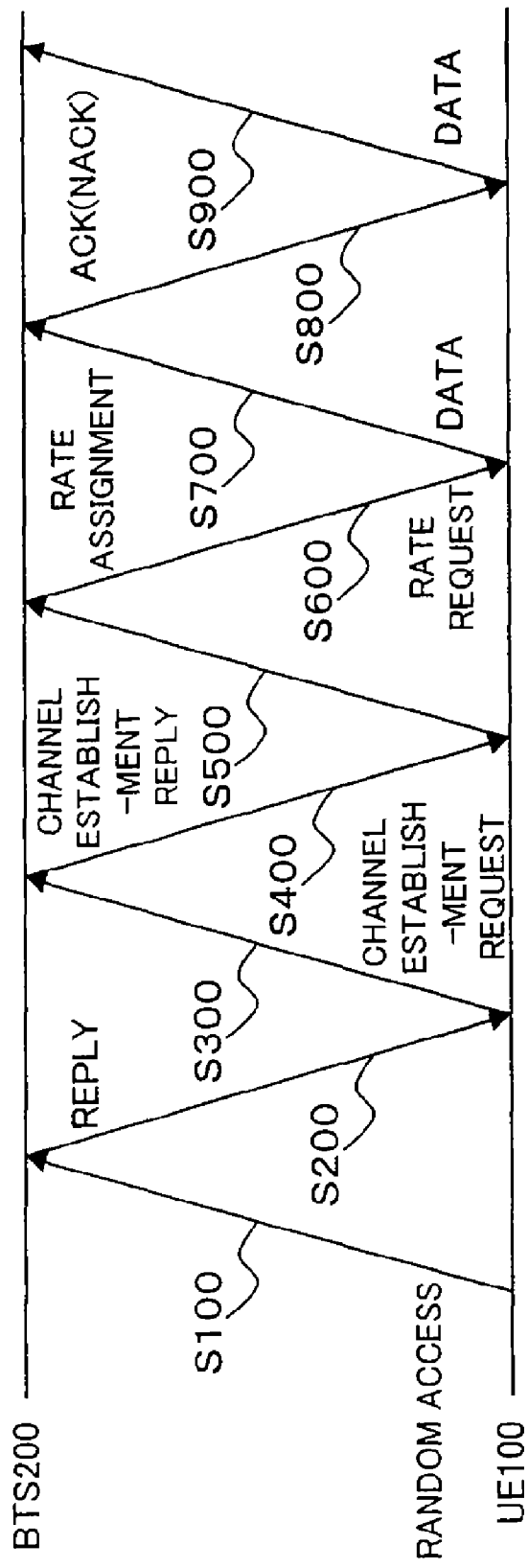
FIG. 25 is a sequence diagram for describing conventional procedures for uplink packet transmission.

As shown in FIG. 24, the mobile station 1 evaluates whether or not a transmission schedule (that is, a data packet to be transmitted) is present (step S61). If there is no transmission schedule, the processing ends (No route of step S61). On the other hand, if there is a transmission schedule, the following (new) data packet is taken out from the data queue 10 (step S62), and the data packet is transmitted from the transmitter 14. Here, the time value of the timer 13 is reset to "0" (step S63).

After that, the mobile station 1 evaluates whether or not downlink signaling (data packet) is received from the base station 2 (step S64). If the evaluation result is negative (No route of step S64), it is further evaluated whether of not the timer value of the timer 13 is below a specific value T (T is a real number not smaller than 0) (step S65). If the timer value is below the specific value T (Yes route of step S65), the timer value is incremented (step S66*a*), and then monitoring is kept continued thereafter, while the time value is incremented, until a downlink data packet is received from the base station 2. Here, if the timer value reaches the specific value T without receiving a downlink data packet from the base station 2, the mobile station 1 transmits a retransmission request to the base station 2 and resets the timer value of the timer 13 to "0" (from No route of step S65 to steps S67 and S63).

On the other hand, if a downlink data packet is received from the base station 2, the mobile station 1 evaluates whether the data packet received is ACK or NACK (step S66*b*). If it is NACK, the mobile station 1 sends a retransmission request to the base station 2 (step S67). If it is ACK, the mobile station 1 further evaluates whether or not the following data packet is present in the data queue 10 (step S68). If the following data packet exists, the mobile station 1 transmits the data packet (from Yes route of step S68 to step S62), and if the data packet does not exist, the mobile station 1 ends the processing (No route of step S68).

That is, in a case where the data packet received from the base station 2 is ACK, and also where the following transmission data exists, if the mobile station 1 receives schedule information, the mobile station 1 transmits the following data with the timing of the scheduling information. If the scheduling information is not received, the mobile station 1 recommences the processing from transmission of a retransmission request. In contrast, if the data packet received form the base station 2 is NACK, and also if the scheduling information is received, the mobile station 1 transmits the following data with the timing of the scheduling information.

If the mobile station 1 has not received scheduling information, or if the mobile station 1 has received nothing (DTX), the mobile station 1 recommences the processing from transmission of a retransmission request.

In other words, the receiver 15 of the mobile station 1 has a function of a reply and transmission permission receiver means which receives scheduling information (permission for uplink data transmission) together with reply information (ACK/NACK) indicating normal reception or abnormal reception of uplink data from the base station 2. If scheduling information is received together with ACK, the transmitter 14 of the mobile station 1, as an uplink data transmitter means, transmits the following uplink data packet in pursuance of the scheduling information. If scheduling information is received together with NACK, the transmitter 14 transmits an uplink data retransmission request to the base station 2 in pursuance of the scheduling information. Further, if no downlink data packet is received from the base station 2 within a specific time period (T), the transmitter 14 transmits an uplink data retransmission request to the base station 2.

Here, in a case where a data packet received from the base station 2 is NACK, data retransmission is available even if the above scheduling information has not been received, under a condition that there is such an agreement between the mobile station 1 and the base station 2 (network).

With this arrangement, in comparison with a case in which ACK/NACK and the scheduling information are separately transmitted to the mobile station 1, the procedures of uplink data transmission are simplified, so that delay in uplink data transmission is reduced, thereby further improving throughput.

Further, the present invention should by no means be limited to the above-illustrated embodiment, but various changes or modifications may be suggested without departing from the gist of the invention.

What is claimed is:

1. A mobile communication system comprising at least one mobile station and a base station, which performs radio communication between the mobile station and the base station, wherein the mobile station comprising:

a selecting unit that selects one of a first mode and a second mode based on an uplink communication state between the mobile station and the base station, the first mode in which the base station's permission is not necessary when the mobile station transmits uplink data, and the second mode in which the base station's permission is necessary when the mobile station transmits uplink data; and the base station comprising:

an evaluating unit that monitors, when operating in the first mode, whether or not uplink data between the mobile station and the base station is received; and a transmitter that transmits information for notifying transmission timing in uplink data transmission to the mobile station based on the received uplink data.

2. A communication method in a mobile communication system including at least one mobile station and a base station, which performs radio communication between the mobile station and the base station, the communication method comprising:

selecting one of a first mode and a second mode based on a communication state between the mobile station and the base station, the first mode in which the base station's permission is not necessary when the mobile station transmits uplink data, and the second mode in which the base station's permission is necessary when the mobile station transmits uplink data;

monitoring, when operating in the first mode, whether or not uplink data between the mobile station and the base station is received; and notifying transmission timing in uplink data transmission to the mobile station based on the received uplink data.

3. A method in a base station for a mobile communication system including at least one mobile station, which performs radio communication between the mobile station and the base station, the method comprising:

operating in one of a first mode and a second mode, the first mode in which the base station's permission is not necessary when the mobile station transmits uplink data, the second mode in which the base station's permission is necessary when the mobile station transmits uplink data;

monitoring, when operating in the first mode, whether or not uplink data between the mobile station and the base station is received; and transmitting information for notifying transmission timing in uplink data transmission to the mobile station based on the received uplink data.

4. A method in a mobile station for a mobile communication system including at least one mobile station and a base station, which performs radio communication between the mobile station and the base station, the method comprising:

selecting one of a first mode and a second mode based on a communication state between the mobile station and the base station, the first mode in which the base station's permission is not necessary when the mobile station transmits uplink data, and the second mode in which the base station's permission is necessary when the mobile station transmits uplink data; and receiving information for notifying transmission timing in uplink data transmission transmitted from the base station, the transmission timing being notified based on the received uplink data.

5. The method in the mobile station according to claim 4, further comprising:

transmitting uplink data including information for user identification to the base station by using the transmission timing.

* * * * *